(12) United States Patent
Khanchin

(10) Patent No.: US 7,880,734 B2
(45) Date of Patent: Feb. 1, 2011

(54) COMPREHENSIVE CONTROL SYSTEM

(76) Inventor: Michael Khanchin, Haatzmaut 85/44, Ashdod (IL)

( * ) Notice: Subject to any disclaimer, the term of this patent is extended or adjusted under 35 U.S.C. 154(b) by 1590 days.

(21) Appl. No.: 11/187,800

(22) Filed: Jul. 25, 2005

(65) Prior Publication Data

US 2006/0020350 A1   Jan. 26, 2006

Related U.S. Application Data

(60) Provisional application No. 60/590,901, filed on Jul. 26, 2004.

(51) Int. Cl.
*G06F 3/038* (2006.01)

(52) U.S. Cl. .................. 345/204; 345/207; 700/11; 710/8

(58) Field of Classification Search ............ 345/42, 345/44, 46, 50–53, 64, 69–70, 82–84, 94–96, 345/204–205, 208–214; 700/7–8, 11, 17, 700/20–23, 106, 286; 710/1–9
See application file for complete search history.

(56) References Cited

U.S. PATENT DOCUMENTS

| | | | | |
|---|---|---|---|---|
| 6,301,509 B1 * | 10/2001 | Obata | ................... | 700/11 |
| 6,794,879 B2 * | 9/2004 | Lawson et al. | ............ | 324/509 |
| 7,587,001 B2 * | 9/2009 | Hazani et al. | ............ | 375/316 |
| 2006/0238250 A1 * | 10/2006 | Camagna et al. | ............ | 330/253 |

* cited by examiner

*Primary Examiner*—Quan-Zhen Wang
*Assistant Examiner*—Mansour M Said
(74) *Attorney, Agent, or Firm*—Mark M. Friedman

(57) ABSTRACT

A comprehensive control system and method of great flexibility. Submodules include the specialized circuitry needed to interface to particular types of field inputs and outputs, but present standardized interfaces to modules or other devices on which they are mounted, reducing overall system cost. Modules can be mounted on backplanes, which suppress outputs to module connectors when modules are absent. An extension to the IEEE 1284 Enhanced Parallel Port standard allows units to be connected in a flexible manner. Submodules include a current-limiting universal digital input submodule able to sense AC signals or DC signals regardless of polarity, and an analog input module offering great flexibility in choice of input signals.

13 Claims, 18 Drawing Sheets

SCHEME FOR READ AND WAIT SIGNAL CREATION

FIRST PASS-THROUGH PORT CONTROL AND "HOST EXIST" SIGNAL CREATION

COMPREHENSIVE CONTROL SYSTEM

This is a continuation-in-part of U.S. Provisional Patent Application No. 60/590,901, filed Jul. 26, 2004

FIELD AND BACKGROUND OF THE INVENTION

The present invention relates to a comprehensive control system and, more particularly, to a system for accepting a variety of signals, processing those signals, and generating signals operative to control a variety of devices. The processing and generating of these signals can be performed by the system, or, optionally, by an external computer, or, as a further option, by the system working together with an external computer.

Various attempts have been made to automate factory machinery and other devices. Such automation generally requires the sensing of inputs and the generation of appropriate outputs. With the advent of computers, it has generally been found desirable to have one or more computers performing this control function. However, most computers are not built to interface directly to factory machinery. For example, factory machinery may provide outputs in such forms as relay closures, thermocouple voltages, or line-voltage signals, and accept inputs such as relay closures or medium-voltage signals, while computers are designed to work with communication protocols such as RS-232 and Ethernet. There exist many systems for interfacing between computers and industrial machinery, however, they are lacking in the flexibility required to allow a system designer to easily assemble a control system, with off-the-shelf components, that provides precisely the desired types of inputs and outputs in a small space and at low cost. Further, it is desirable to be able to quickly repair a control system when components fail, and without having to maintain a large stock of replacement parts.

Factories tend to be electrically noisy environments, with frequent switching of large loads such as motors and heaters. Such electrical noise can be disruptive or damaging to computer systems. Furthermore, the skill levels of factory workers are varied, with the attendant risk that accidental connections could damage sensitive equipment. It is thus desirable that inputs to factory control systems be protected from noise and incorrect connections. Optical isolation is particularly desirable, providing a high level of safety for personnel and equipment.

In setting up and maintaining a factory automation system it is preferable that the system be as simple as possible. Thus, it is desirable that such a system be modular, and, preferably, that the addressing scheme by which a computer or other data processor selects individual inputs and outputs be automatically configured.

Because much of the interface circuitry for various types of inputs or outputs is similar, it is economical to have a generic computer interface capable of accepting a variety of input or output devices, referred to herein as "submodules", with the submodules including specialized circuitry for each particular type of input or output. Such a generic computer interface, operative to accept submodules, can be incorporated within the computer, or can take the form of a device inserted into the computer, such as a circuit board having a standard interface, such as, for example, PCI, cPCI, ISA, PMC, VME or PC-104, to the computer, or a device connected to the computer via a standard communications port, such as, for example, RS-232 or Ethernet, or any other suitable device operative to connect the computer to submodules.

There is thus a widely recognized need for, and it would be highly advantageous to have, a modular control system capable of interfacing a wide variety of inputs and outputs, and capable of interfacing to a wide variety of computer communication protocols, or, optionally, to provide self-contained computational capability.

DEFINITIONS

As used herein, unless otherwise specified, the term "field input" refers to an input from a device external to a control system. Examples include relay closures and thermocouple voltages.

As used herein, unless otherwise specified, the term "field output" refers to an output from a control system to an external device. Examples include voltages and relay closures.

As used herein, with respect to biasing of junction transistors, unless otherwise specified, the term "reverse-bias" refers to the biasing of a transistor so that the base-emitter junction is reverse-biased and the collector-base junction is forward-biased. Under these conditions, the transistor can act as an amplifier, although typically with less gain and power-handling capability than under the normal bias arrangement.

SUMMARY OF THE INVENTION

According to the present invention there is provided a control system including: (a) a submodule, and (b) an interface, and wherein the submodule is operative to be connected to an external device via the interface, and wherein the interface is operative to be connected, at any particular time, to a submodule chosen from a plurality of submodules.

Preferably, in the system, the submodule includes: (i) a first input terminal; (ii) a second input terminal; (iii) a first light source having a corresponding anode and having a corresponding cathode, the first light source operative to emit light when the anode of the first light source is positive with respect to the cathode of the first light source; (iv) a second light source having a corresponding anode and having a corresponding cathode, the second light source operative to emit light when the anode of the second light source is positive with respect to the cathode of the second light source; (v) an optical detector operative to detect light emitted by the first light source and operative to detect light emitted by the second light source, and further operative to output a signal upon detection of light, and (vi) two current limiters, and wherein the anode of the first light source is connected to the cathode of the second light source at a first junction, and wherein the cathode of the first light source is connected to the anode of the second light source at a second junction, and wherein a first current limiter is connected serially between the first input terminal and the first junction and wherein a second current limiter is connected serially between the second input terminal and the second junction, the submodule being operative to detect a voltage difference between the first input terminal and the second input terminal regardless of polarity.

Preferably, in the system, a current limiter is characterized by having a current vs. voltage characteristic having a slope that decreases in absolute value for increasing absolute value of voltage across the current limiter for some range of voltages across the current limiter.

Preferably, in the system, the submodule further includes: (vii) a capacitor, and (viii) a switch, the capacitor being operative to filter the output of the optical detector, and the switch being connected in series with the capacitor and operative to control the filtering.

Preferably, in the system, the submodule includes: (i) a first analog multiplexer operative to multiplex a first plurality of inputs; (ii) a second analog multiplexer operative to multiplex a second plurality of inputs; (iii) a third analog multiplexer operative to multiplex an output of the first analog multiplexer, an output of the second analog multiplexer, a reference voltage and ground; (iv) a fourth analog multiplexer operative to multiplex an output of the first analog multiplexer, an output of the second analog multiplexer, a reference voltage and ground; (v) an amplifier having a positive input and a negative input, and (vi) an analog to digital converter, and the positive input of the amplifier is connected to an output of the third analog multiplexer and the negative input of the amplifier is connected to an output of the fourth analog multiplexer, and an input of the analog to digital converter is connected to an output of the amplifier.

Preferably, in the system, the submodule includes a connector operative to facilitate connection and disconnection of the submodule from the interface.

Preferably, in the system, the interface is operative to connect the submodule to a processor.

Preferably, in the system, the interface includes an addressing mechanism operative to allow the processor to selectively control a device within the submodule.

Preferably, in the system, the submodule includes a mechanism operative to perform a signal translation selected from the group consisting of translating a signal received from the processor to a signal compatible with the external device and translating a signal received from the external device to a signal compatible with the processor.

Preferably, in the system, the interface includes: (i) a first submodule connector operative to accept a submodule; (ii) a second submodule connector operative to accept a submodule; (iii) a third submodule connector operative to accept a submodule, and (iv) a field connector operative to connect to at least one external device, and a first terminal of the field connector is connected to a first terminal of the first submodule connector and to a first terminal of the third submodule connector, and a second terminal of the field connector is connected to a third terminal of the first submodule connector and to a second terminal of the third submodule connector, and a third terminal of the field connector is connected to a first terminal of the second submodule connector and to a third terminal of the third submodule connector, and a fourth terminal of the field connector is connected to a third terminal of the second submodule connector and to a fourth terminal of the third submodule connector and at least two terminals selected from the group consisting of a second terminal and a fourth terminal of the first submodule connector and a second terminal and a fourth terminal of the second submodule connector are connected to each other and to a fifth terminal of the field connector.

Preferably, in the system, the submodule includes: (i) a first device; (ii) a second device, and (iii) an interface connector, and a first terminal of the first device is connected to a first terminal of the interface connector, a second terminal of the first device is connected to a second terminal of the interface connector, a first terminal of the second device is connected to a third terminal of the interface connector, and a second terminal of the second device is connected to a fourth terminal of the interface connector, the interface connector operative to mate with a submodule connector such that respective terminals of the interface connector are connected to corresponding terminals of the submodule connector.

Thus, if the submodule includes a two-input device, connection of the submodule to the first submodule connector or to the second submodule connector will result in the device having single-ended input, whereas connection of the submodule to the third submodule connector will result in the device having differential input.

Preferably, in the system, the interface includes (i) a module carrier board; (ii) a backplane, and (iii) a processor, the module carrier board operative to accept at least one submodule, the module carrier board having at least one field connector operative to connect a field terminal of the submodule to an external device, the module carrier board also having a control connector operative to connect the module carrier board to the backplane, the backplane operative to connect the module carrier board to the processor.

Preferably, in the system, the module carrier board is operative to supply a signal proportional to a power supply voltage of the module carrier board, and the backplane is operative to disable an output of the backplane until the signal has been at a value at least equal to a pre-determined threshold value for at least a pre-determined time interval.

Preferably, in the system, the disabling includes setting the output to a high-impedance state.

According to the present invention there is further provided an automatic addressing system including a plurality of units, each unit including: (a) a first connector having address-assignment terminals having number no less than the number of units, less one; (b) a second connector having address-assignment terminals like in number to the address-assignment terminals of the first connector, each address-assignment terminal of the second connector being in a position corresponding to an address-assignment terminal of the first connector, and (c) address-assignment lines one less in number than the address-assignment terminals of the first connector, each address-assignment line operative to electrically connect an address-assignment terminal of the first connector to a non-corresponding address-assignment terminal of the second connector; (d) a mechanism operative to impress a low logic level upon an address-assignment terminal of the second connector of the unit that is unconnected to any address-assignment line of the unit, if all the address-assignment terminals of the first connector of the unit are at a high logic level; (e) decoded address lines one greater in number than the address-assignment terminals, one respective decoded address line corresponding to the address-assignment terminal of the second connector of the unit that is unconnected to any address-assignment line of the unit, and all respective other decoded address lines each corresponding to a respective address-assignment terminal of the first connector of the unit, and (f) a mechanism operative to activate a unit-addressed signal if a condition selected from the group consisting of the condition of the address-assignment terminal of the second connector of the unit that is unconnected to any address-assignment line of the unit being at a low logic level and the corresponding decoded address line being active, and the condition of an address-assignment terminal of the first connector of the unit being at a low logic level and a corresponding decoded address line being active, exists, and the first connector of each unit is operative to be connected to the second connector of another unit, except that the first connector of a first unit is not connected to any other unit, and the second connector of a last unit is not connected to any other unit.

Preferably, the system further includes: (g) a mechanism operative to disable an output of a portion of the unit if any address-assignment terminal of the first connector of the unit is at a low logic level.

Preferably, in the system, the disabling includes setting the output to a high-impedance state.

According to the present invention, there is still further provided a system including a pass-through interface and suitable for connection to a host, the interface further including circuitry operative to output a host detect signal equal to a logical oring of an address strobe signal of the host and a data strobe signal of the host if the host is connected via the interface, and equal to logical zero if no host is connected via the interface.

Preferably, in the system, the interface substantially complies with IEEE Standard 1284.

Preferably, in the system, the system is operative to disable a processor associated with the system if the host detect signal is at a high logic level.

Preferably, in the system, the disabling includes setting an output of the processor to a high-impedance state.

Preferably, in the system, the system further includes a first pass-though port suitable for connection to a first compatible system, and a second pass-through port suitable for connection to a second compatible system, and wherein the system is operative to suppress a read operation if the first compatible system is responsive to the read operation and the second compatible system is responsive to the read operation.

Preferably, in the system, the suppressing includes setting an output to a high-impedance state.

Preferably, in the system, the system further includes a first pass-though port suitable for connection to a first compatible system, and a second pass-through port suitable for connection to a second compatible system, and wherein the system is operative to suppress a read operation if the system is responsive to the read operation and if a compatible system selected from the group consisting of the first compatible system and the second compatible system is responsive to the read operation.

Preferably, in the system, the suppressing includes setting an output to a high-impedance state.

According to the present invention there is provided a control method including the steps of: (a) providing a submodule; (b) providing an interface, and (c) connecting the submodule to an external device via the interface, and the interface is operative to be connected, at any particular time, to a submodule chosen from a plurality of submodules.

According to the present invention there is further provided a method for automatically addressing a plurality of units, the method including the steps of: (a) providing for each unit: (i) a first connector having address-assignment terminals having number no less than the units, less one; (ii) a second connector having address-assignment terminals like in number to the address-assignment terminals of the first connector, each address-assignment terminal of the second connector being in a position corresponding to an address-assignment terminal of the first connector, and (iii) address-assignment lines one less in number than the address-assignment terminals of the first connector, each address-assignment line operative to electrically connect an address-assignment terminal of the first connector to a non-corresponding address-assignment terminal of the second connector; (iv) a mechanism operative to impress a low logic level upon an address-assignment terminal of the second connector of the unit that is unconnected to any address-assignment line of the unit, if all the address-assignment terminals of the first connector of the unit are at a high logic level; (v) decoded address lines one greater in number than the address-assignment terminals, one respective decoded address line corresponding to the address-assignment terminal of the second connector of the unit that is unconnected to any address-assignment line of the unit, and all respective other decoded address lines each corresponding to a respective address-assignment terminal of the first connector of the unit, and (vi) a mechanism operative to activate a unit-addressed signal if a condition selected from the group consisting of the condition of the address-assignment terminal of the second connector of the unit that is unconnected to any address-assignment line of the unit being at a low logic level and the corresponding decoded address line being active, and the condition of an address-assignment terminal of the first connector of the unit being at a low logic level and a corresponding decoded address line being active, exists, and (b) connecting the first connector of each unit to a second connector of another unit, except that the first connector of a first unit is not connected to any other unit, and the second connector of a last unit is not connected to any other unit.

According to the present invention, there is still further provided a method for communication including the steps of: (a) providing a system including a pass-through interface suitable for connection to a host, and (b) providing a host detect signal by logically oring an address strobe signal of the host and a data strobe signal of the host if the host is connected via the interface, and equal to logical zero if no host is connected via the interface.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a comprehensive control system which can be used to facilitate automation and data acquisition. Specifically, the present invention can be used to accept signals from various devices, process those signals, possibly in cooperation with a host computer, and transmit signals, possibly including control signals, to a variety of devices.

The principles and operation of a comprehensive control system according to the present invention may be better understood with reference to the drawings and the accompanying description.

In a control system according to the present invention, the specialized electronic hardware required for interfacing to a particular field input or field output is located in devices referred to herein as submodules. Submodules included in a control system according to the present invention have a single type of interface to the rest of the control system, via at least one control connector. Submodules included in a control system according to the present invention also have at least one field connector operative to connect the circuitry of the submodule to field inputs and field outputs. Although it is generally preferable, according to the present invention, that, for the sake of simplicity and to reduce inventory requirements, field connectors be of a common type, certain types of submodules, such as those handling high voltages, can have specialized field connectors.

A submodule can be mounted on a module, the module being operative to provide mechanical support and electrical connection to external devices for the submodule, with the module having connectors for mounting one or more submodules.

Figure 1:
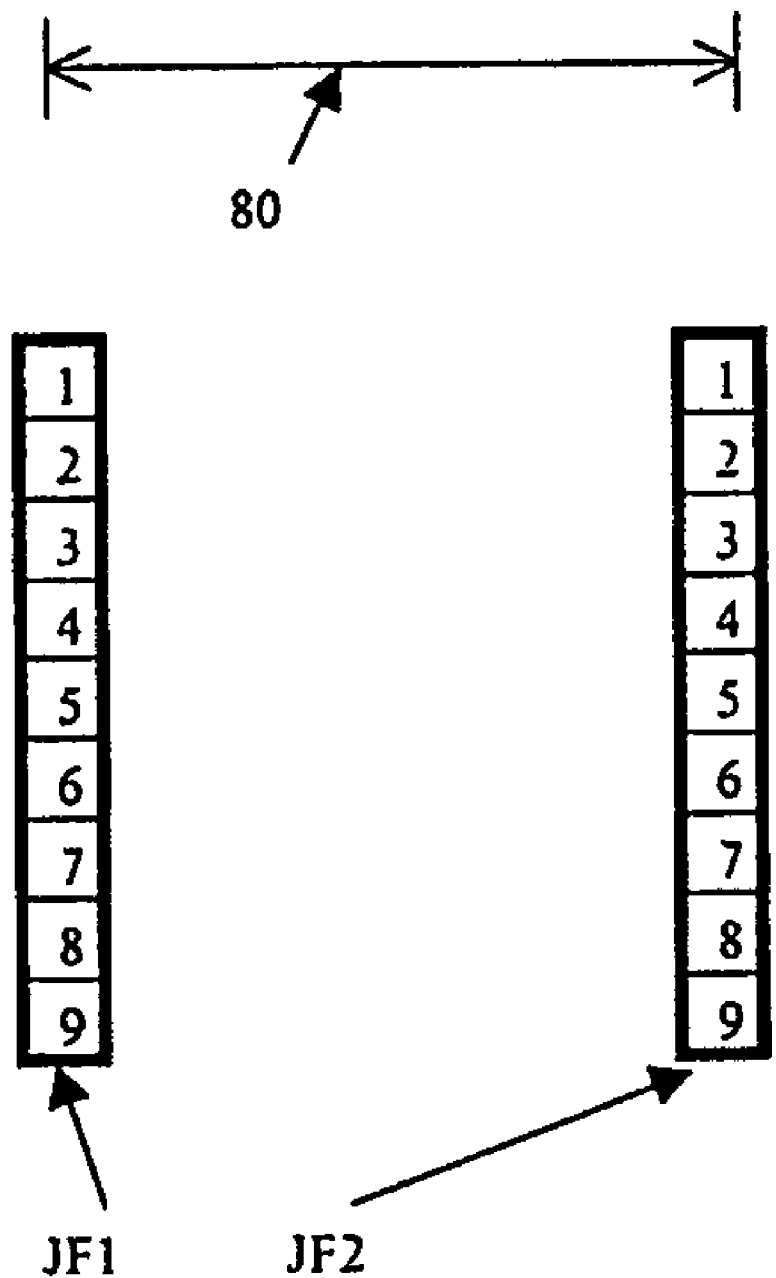
FIG. 1 illustrates schematically an example of a mechanical layout of field connectors for a submodule.
Figure 2:
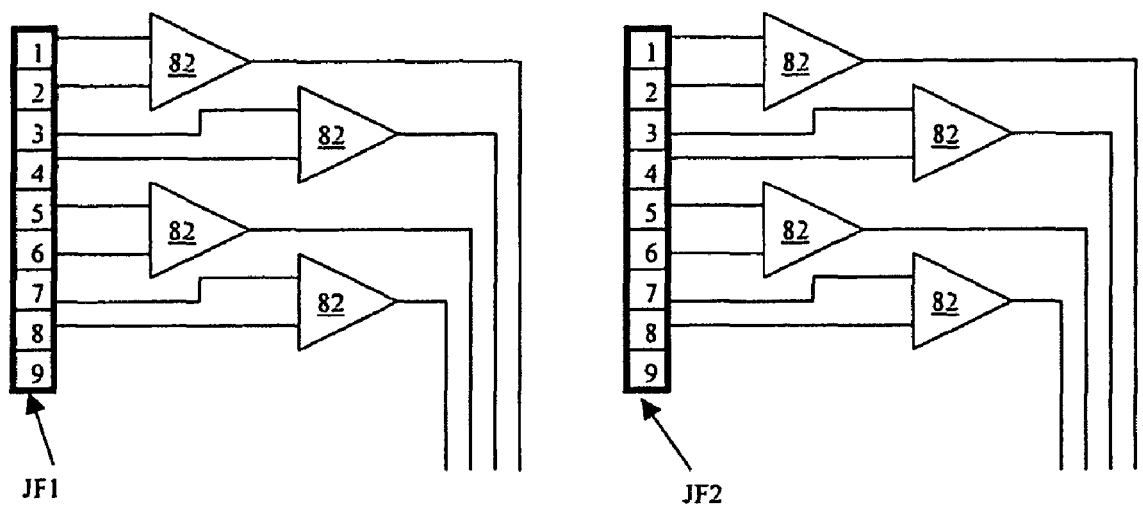
FIG. 2 illustrates schematically an electrical layout of an example of a submodule.

In one preferred embodiment of the present invention, submodules can be mounted on modules in two different ways, as seen, for example, with the aid of FIGS. 1, 2, 3, and 4, and described in detail below. Each submodule includes at least one connector operative to connect that submodule to appropriate field wiring via, for example, the above-mentioned connectors on modules. FIG. 1 illustrates schematically an example of a mechanical layout of field connectors JF1 and JF2 for a submodule. In this example each submodule includes two connectors, JF1 and JF2, for field wiring, connectors JF1 and JF2 being separated by a distance indicated by a dimension line 80. FIG. 2 is an electrical schematic of an example of a submodule. In this illustrative example, field wiring connecting inputs of a set of amplifiers 82 to connectors JF1 and JF2 is shown, although inputs or outputs of other devices can be arranged similarly, and such arrangements are within the scope of the present invention.

Figure 3:
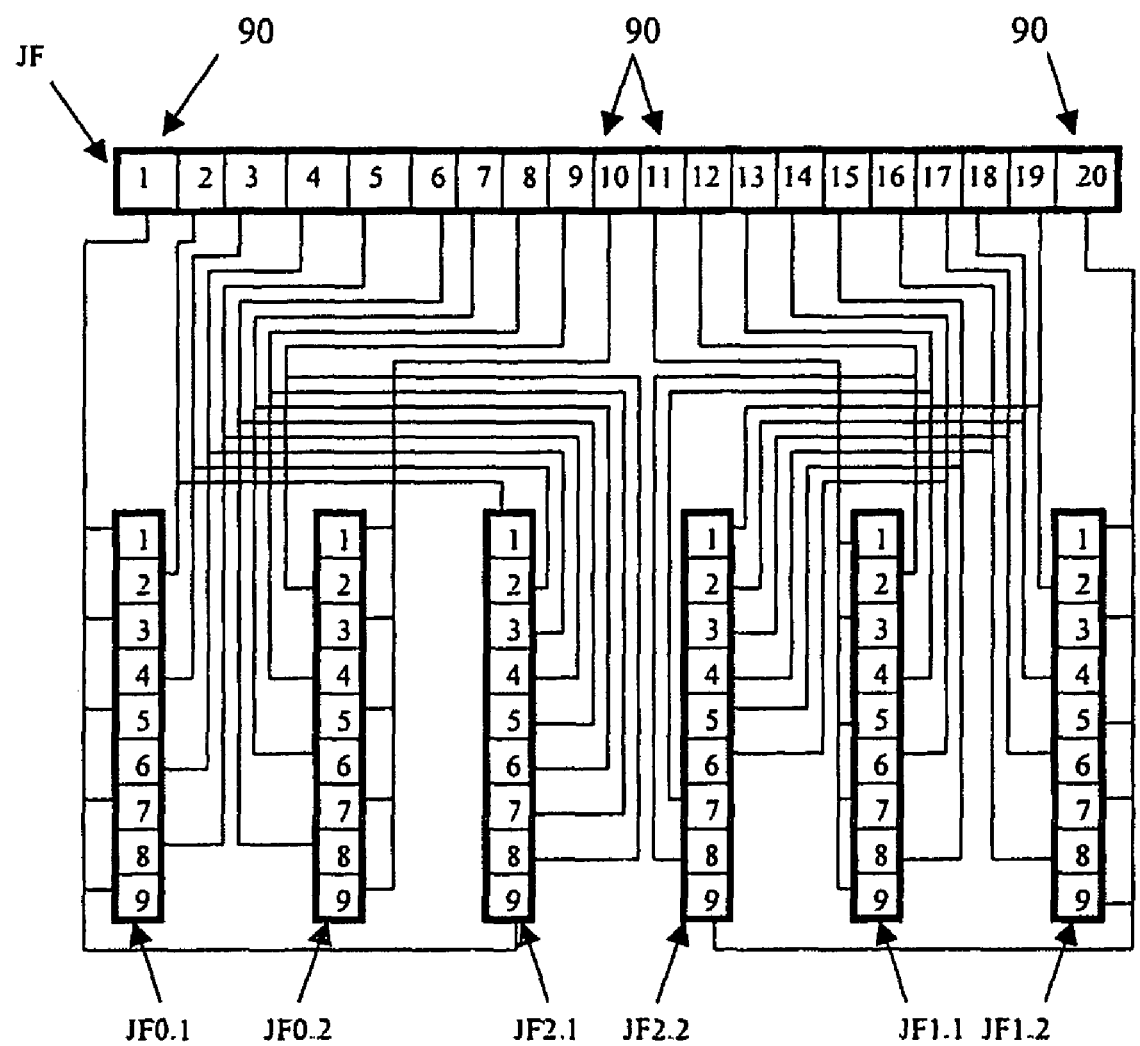
FIG. 3 is an electrical schematic of an example of field wiring of a module.
Figure 4:
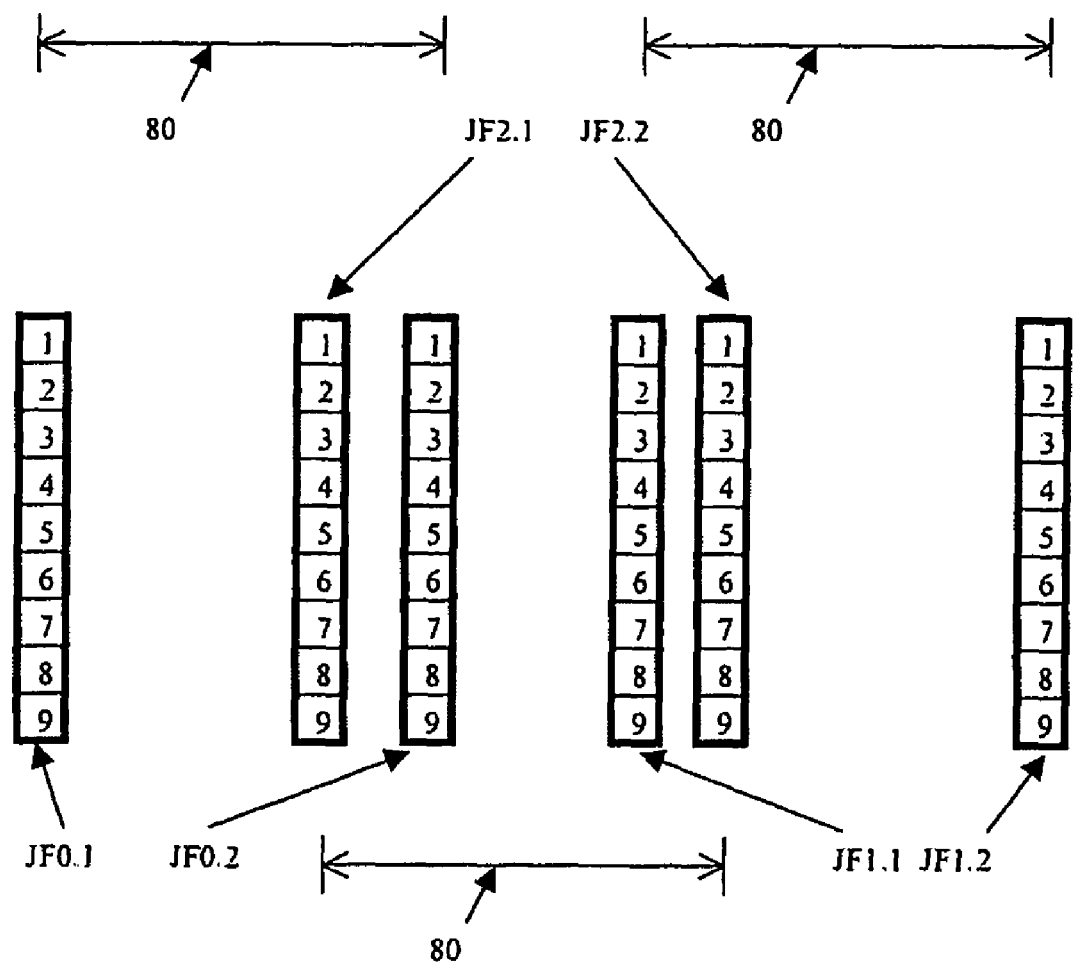
FIG. 4 illustrates schematically a preferred mechanical arrangement of connectors on a module.

FIG. 3 is an electrical schematic of an example of field wiring of a module. For reasons of illustrative clarity, the positions of connectors JF0.1, JF0.2, JF1.1, JF1.2, JF2.1 and JF2.2 in FIG. 3 do not correspond to the preferred mechanical arrangement of those connectors on the module. Rather, FIG. 4 illustrates schematically a preferred mechanical arrangement of connectors JF0.1, JF0.2, JF1.1, JF1.2, JF2.1 and JF2.2 on a module, this arrangement allowing for wider spacing between connectors JF0.1 and JF0.2, between connectors JF1.1 and JF1.2, and between connectors JF2.1 and JF2.2, than would be possible with the mechanical arrangement of FIG. 3, although other mechanical arrangements are possible, and are within the scope of the present invention. In this preferred mechanical arrangement connectors JF0.1 and JF0.2 are separated from each other by a distance indicated by a dimension line 80, corresponding to the distance between connectors JF1 and JF2 of a submodule, as indicated schematically by dimension line 80 in FIG. 1. Similarly, connectors JF1.1 and JF1.2 are separated from each other by the distance indicated by dimension line 80, and connectors JF2.1 and JF2.2 are also separated from each other by the distance indicated by dimension line 80.

In a first way of mounting submodules on modules, a single submodule, for example, an input submodule such as that of FIG. 2, is mounted in the center of the face of the module, with connectors JF1 and JF2 (FIG. 1) of the submodule mating with connectors JF2.1 and JF2.2 (FIGS. 3 and 4) of the module, respectively. When mounted in this fashion, each of two inputs of each respective amplifier 82 of the submodule is connected to a corresponding separate field terminal, facilitating differential input to each amplifier 82.

In a second way of mounting submodules on modules, a first submodule can be mounted on a face of the module toward one side of the module, with connectors JF1 and JF2 (FIG. 1) of this first submodule mating with connectors JF0.1 and JF0.2 (FIGS. 3 and 4) of the module, respectively, and a second submodule can be mounted on the face of the module toward the other side of the module, with connectors JF1 and JF2 (FIG. 1) of this second submodule mating with connectors JF1.1 and JF1.2 (FIGS. 3 and 4) of the module, respectively. When mounted in this fashion, one input of each respective amplifier 82 of the submodules is connected to a corresponding separate field terminal, while a second input of each respective amplifier 82 of the submodules is connected to a common field terminal 90 (FIG. 3), facilitating single-ended input to each amplifier 82, and with twice as many amplifiers 82 on the module as in the differential-input scheme.

Figure 5:
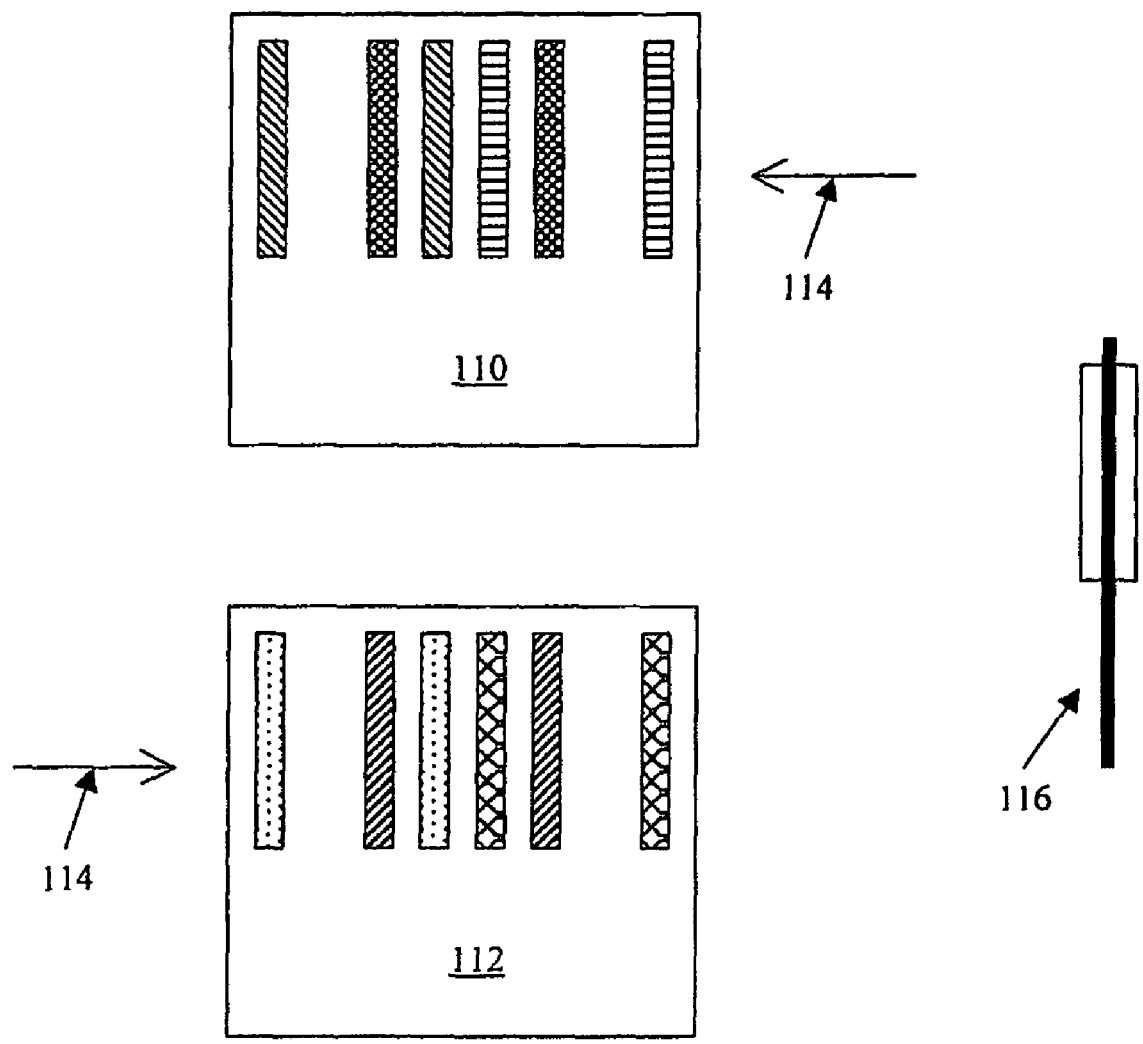
FIG. 5 illustrates schematically several views of a module operative to mount submodules on both faces of the module.

Optionally, modules can also be constructed so as to have connectors on both faces of the module, as illustrated schematically in FIG. 5, wherein a first face 110 of a module and a second face 112 of that module are shown, along with a view 116 of the module as sighted along an arrow 114 included in the illustration as an aid to orientation. For example, two amplifier submodules (not shown) can be connected with single-ended inputs, as described above, on the first face 110 of such a module, and a third amplifier submodule (not shown) connected with differential inputs, as described above, on the second face 112 of the module. It will be readily apparent to those skilled in the art that various such combinations may be made. All such combinations are within the scope of the present invention.

Although submodules in the above examples are each provided with two field wiring connectors, JF1 and JF2, with corresponding connectors on the modules, it will be appreciated by those skilled in the art that it is possible to obtain substantially the same flexibility in mounting options as described above for other numbers of field wiring connectors per submodule, with corresponding numbers of connectors on the modules. For example, the above example can be modified to use submodules (not shown) each having one field wiring connector, and modules (not shown) having only three field wiring connectors per face, rather than the six field wiring connectors per face in the above example. Such variations are within the scope of the present invention.

Submodules according to the present invention can also be mounted on circuit boards suitable for mounting in computers, equipment racks, or other devices, rather than on the modules of the present invention. This is well-suited to smaller control systems, where a single type of circuit board, operative to accept submodules, can be mated to submodules of various types. This reduces cost because there is no need to have a different type of circuit board, with a full host system interface, for every type of field connection, such as, for example, digital output or thermocouple input. Instead, various types of submodules, which are less expensive than circuit boards having host system interfaces, accommodate the various types of field connections, and a single type of circuit board provides the interface to the host system. Such circuit boards include, but are not limited to, PCI, cPCI, ISA, PMC, VME and PC-104. This allows the placement of circuitry for interfacing a host system to the submodule on the circuit board, while only circuitry needed to accommodate a particular type of input or output is placed on the submodule. This provides flexibility in the types of inputs and outputs the system can work with, at reduced overall cost, because changes in types of inputs or outputs can be accommodated by replacing a submodule rather than an entire circuit board. A single circuit board can accommodate more than one submodule, and, subject to space limitations, submodules can, optionally, be mounted on both sides of a circuit board. Additionally, the above-described mechanism for selecting single-ended or differential connection of inputs or outputs for submodules mounted on modules can also be implemented for submodules mounted on a circuit board.

A module can be constructed on the basis of what is referred to herein as a "module carrier" board, which may also be referred to as a "module basis" board, which is a circuit board having at least one submodule control connector and at least one submodule field connector, the submodule control connector and submodule field connector being suitable for connecting a submodule to the module carrier board, and at least one connector suitable for field connections, the module basis board having wiring operative to connect respective terminals of the submodule field connector to appropriate terminals of the field connector. Field connectors can be devices such as IDC (Insulation Displacement Connector) connectors, screw-terminal blocks or other devices suitable for making field connections. A module carrier board can also have a module control connector operative to connect the module carrier board to a backplane or other device suitable to connect the module carrier board to a processor. A module carrier board can also include a connector suitable for connecting a display device, such as an array of LEDs.

A submodule control connector can include terminals having various functions, including terminals operative to allow detection of a code indicating the type of a submodule (for example, if the submodule is a digital input submodule, a thermocouple submodule, etc.), terminals operative to provide power-supply voltages and ground, terminals operative to carry addresses, terminals operative to carry data, and terminals operative to carry signals for an optional LED display.

Construction of modules in this fashion allows for great flexibility in providing a control and measurement system with the particular capabilities required by an application at low cost, and using only a limited number of components.

According to the present invention, one or more modules can be connected to a backplane, the backplane being operative to connect the modules to a processor and to provide for addressing to allow the processor to interact with individual modules. The processor can be a module connected to the backplane, or a separate processor connected to the backplane as described below. The term "backplane", as used herein, can refer to a backplane by itself, or to a backplane connected to one or more modules. The intent will be clear from context.

Figure 6:
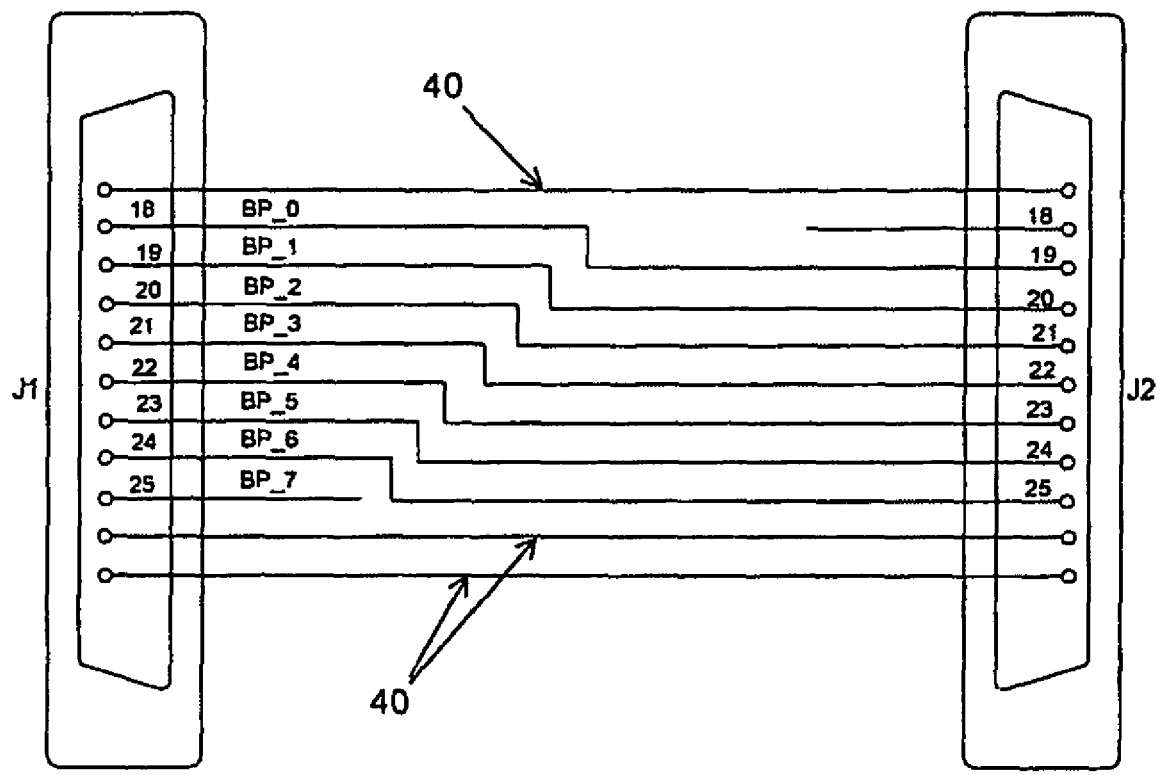
FIG. 6 illustrates schematically wiring of a backplane suitable for automatic addressing according to the present invention.

Preferably, a backplane with a set of modules connected to the backplane is placed within an enclosure operative to provide mechanical support and physical protection, to form a "unit". Optionally, one of the modules within a unit is a processor. Backplanes can be connected together via connectors projecting from the sides of the backplanes, either by directly connecting a right-side connector of one backplane to a left-side connector of another backplane, or via a cable. When a backplane is installed in an enclosure to form a unit, these connectors project from the enclosure in a manner that allows units to be connected to each other either directly or via a cable. Optionally, individual units and/or mated units can be mounted on a suitable mounting device, such as a DIN rail. These connection options can be mixed and matched within a control system, subject only to limitations on the number of units that can be addressed within a single system, and cable length constraints. Connected units are automatically addressed, and any redundant processors within units are disabled, by the use of lines connected in a staggered arrangement within each unit. Preferably, these lines are on a backplane within each unit, but other wiring mechanisms are possible, and are within the scope of the present invention. In such an arrangement a line connected to a particular pin of a bus connector on one side of a backplane is connected, not to the corresponding pin of the bus connector on the opposite side of the backplane but rather to another pin, preferably, but not necessarily, adjacent to the corresponding pin, as illustrated schematically in FIG. 6. As seen in FIG. 6, a pin 18 of a connector J1, at left, is connected, via a line BP_0, to a pin 19 of a connector J2, at right. Similarly, a pin 19 of J1 is connected, via a line BP_1, to a pin 20 of J2, and so forth, with a pin 24 of J1 connected, via a line BP_6, to a pin 25 of J2. A pin 25 of J1 is connected to a line BP_7, but is not passed through to J2, and a pin 18 of J2 is not used.

Alternatively, pin 18 of connector J2 can be used to prevent damage to the system if an "enhanced unit" (see below) is accidentally connected to an automatically addressed unit, as is explained further below in the description of enhanced units.

Lines other than BP_0-BP_7, including, but not limited to, address and data lines, are not part of the staggered arrangement, but rather are each passed through from a respective pin of J1 to a corresponding pin of J2. Lines 40 schematically illustrate such connections, although, for the sake of simplicity, the number of lines 40 shown in the illustration is much fewer than in a typical implementation of the present invention.

For the sake of simplicity, not all pins of connectors J1 and J2 are shown, nor are all pins labeled.

Although FIG. 6 illustrates an example having eight lines BP_0-BP_7 for automatic addressing, it will be appreciated by those skilled in the art that other numbers of such automatic addressing lines can be used, and that the total number of backplanes that can be accommodated will vary accordingly. Such variations are within the scope of the present invention.

Figure 7:
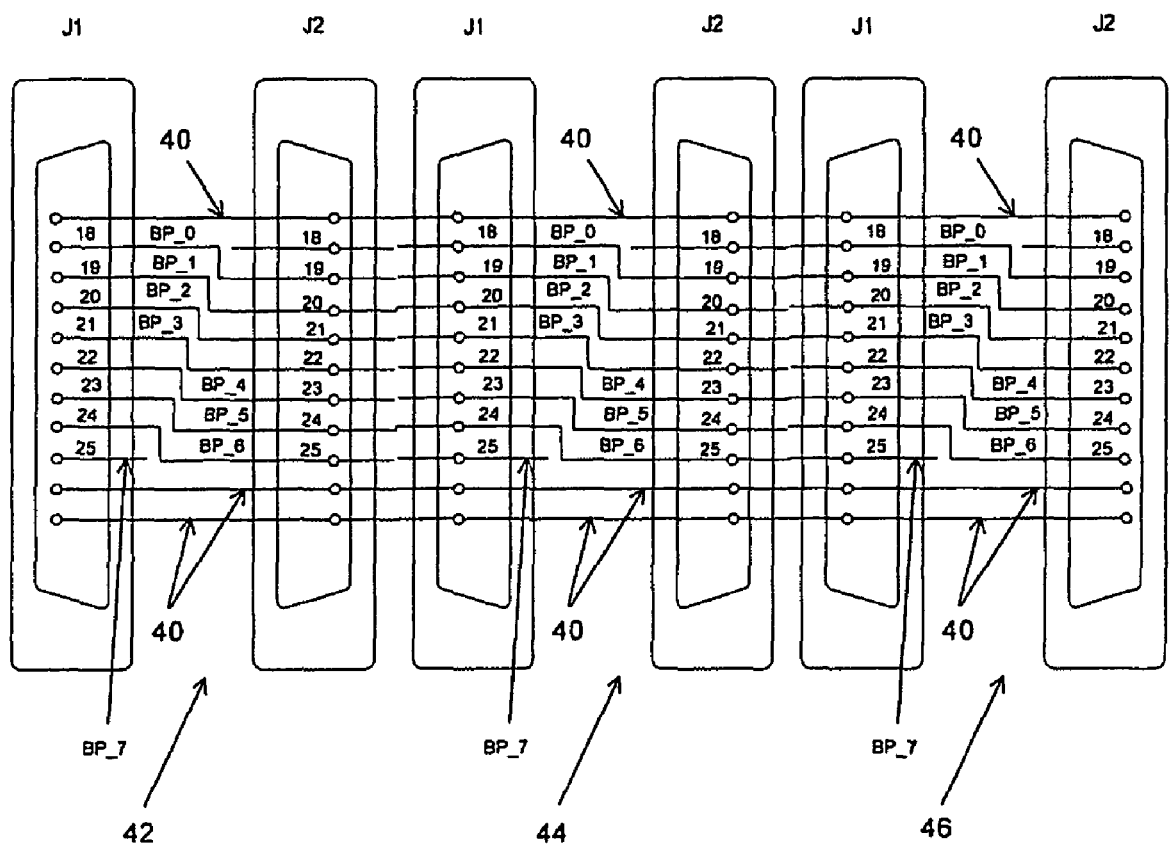
FIG. 7 illustrates schematically an example wherein three backplanes according to FIG. 6 are connected together.

FIG. 7 illustrates schematically an example wherein three backplanes according to FIG. 6 are connected together. Connector J2 of a leftmost backplane 42 is connected to connector J1 of a middle backplane 44, and connector J2 of middle backplane 44 is connected to connector J1 of a rightmost backplane 46. In this arrangement, a processor capable of controlling submodules must be connected to, or included within, leftmost backplane 42. Leftmost backplane 42 is referred to as the master backplane. Each backplane includes circuitry, described in detail below, operative to detect the presence of a master backplane to the left of that backplane, and, if so, to prevent the processor of that backplane from interfering with the master backplane. Such interference is prevented by, for example, disabling any outputs of the processor of that backplane. A processor associated with a backplane not detecting a master backplane to the left of that backplane will act as the processor of the system, thus establishing that backplane as the master backplane and set line BP_0 of that backplane to logic zero (i.e., ground). When several backplanes are connected to each other, as in FIG. 7, the ground signal applied by master backplane 42 to line BP_0 of that master backplane 42 propagates through the backplanes to the right of master backplane 42. Each respective backplane is operative to sense the voltage on each of the lines BP_1-BP_7 of that respective backplane.

Only the leftmost, i.e., master, backplane will not sense ground on any of the lines BP_1-BP_7.

Any other backplane will sense ground on one of the lines BP_1-BP_7, and will disable its processor by a mechanism described below.

Figure 8:
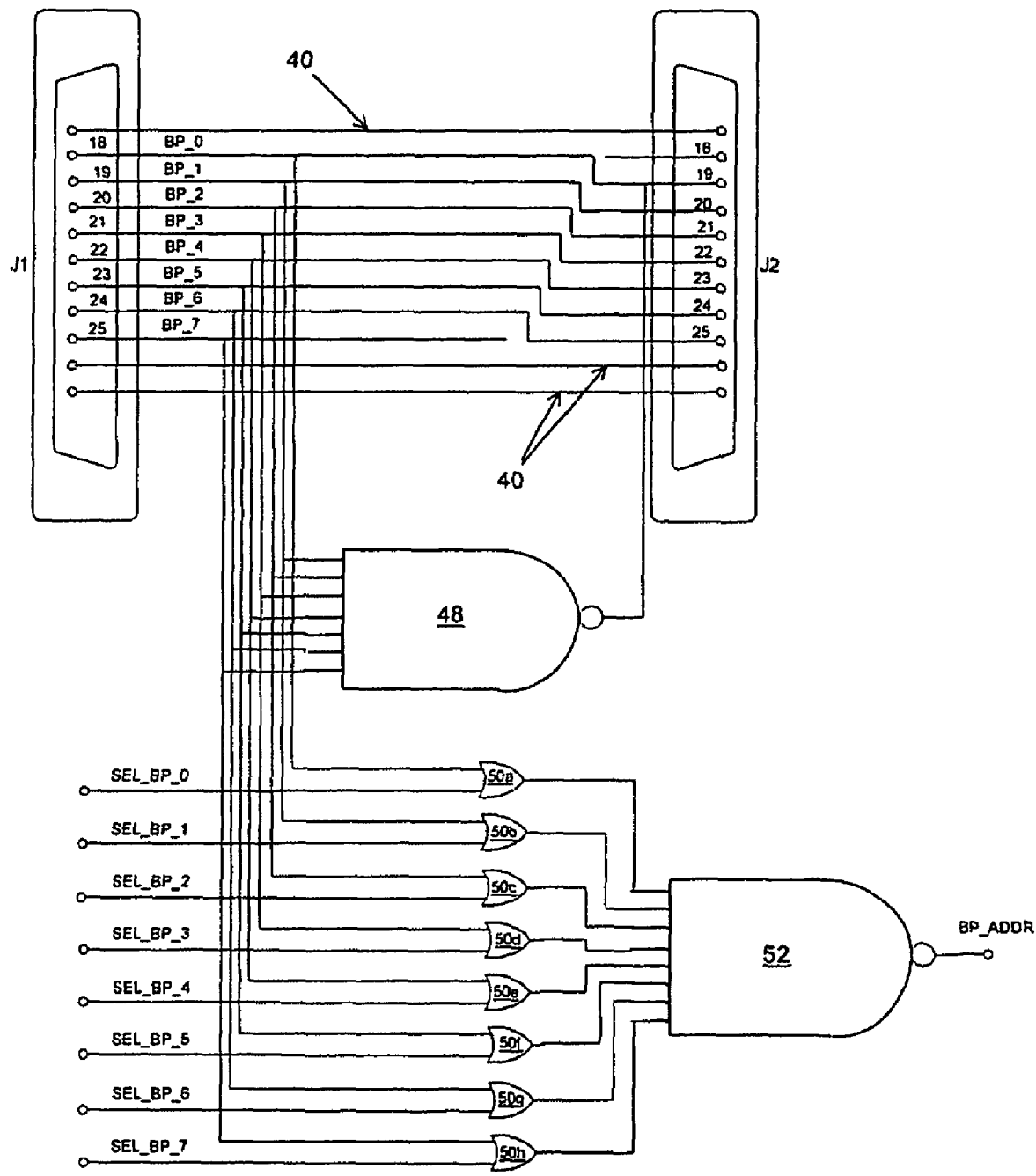
FIG. 8 illustrates schematically a mechanism for disabling processors associated with backplanes other than the master backplane, and a mechanism for automatically addressing backplanes.

FIG. 8 illustrates schematically a mechanism for disabling processors associated with backplanes other than the master backplane, and a mechanism for automatically addressing backplanes. In a backplane in the leftmost position in a group of connected backplanes, such as backplane 42 in FIG. 7, none of the inputs BP_1-BP_7 applied to nand gate 48 are grounded, and, preferably, all inputs BP_1-BP_7 applied to nand gate 48 are connected to pull-up devices, such as resistors (not shown). Therefore, a logic zero is applied to line BP_0. (Note that BP_0 is not among the inputs to nand gate 48.) Logic zero on line BP_0 of a backplane is operative to allow normal operation of a processor of that backplane, such that that backplane operates as the master backplane.

In a backplane that is not in the leftmost position of a group of connected backplanes, such as, for example, backplane 46 in FIG. 7, one of the inputs BP_1-BP_7 applied to nand gate 48 of that backplane (backplane 46 in this illustrative example) carries a ground signal, generated by nand gate 48 of the master backplane (backplane 42 in this illustrative example), as described above. In the particular example of backplane 46, line BP_2 of backplane 46 will be grounded. Thus, nand gate 48 will apply a logic one to line BP_0. Logic one on line BP_0 of a backplane is operative to disable a processor associated with that backplane so as not to interfere with the master backplane. Such interference is prevented by, for example, disabling outputs of any processor associated with that backplane.

The ground signal applied to line BP_0 of leftmost (master) backplane 42 by nand gate 48 of that backplane 42 thus propagates through any other backplanes connected in the group, on a different respective line within each respective backplane, and causes disablement of any processors associated with non-master backplanes.

Optionally, the output of nand gate 48 can be connected to line BP_0 indirectly, via, for example, a processor. This provides additional flexibility in determining the conditions under which line BP_0 will be grounded.

Because a different one of lines BP_0-BP_7 is grounded in each backplane, each backplane can automatically be made responsive to a different address via logic such as that illustrated schematically in the lower portion of FIG. 8. In the example of FIG. 8, wherein a maximum of eight backplanes can be accommodated, selection among the various backplanes can be encoded on three binary address lines (not shown). These address lines can be decoded by a decoder (not shown) with active-low outputs driving eight active-low decoded address lines SEL_BP_0-SEL_BP_7. All of lines SEL_BP_0-SEL_BP_7 are available on each backplane. Only one decoded address line is low (active) at a time. Each respective address line SEL_BP_0-SEL_BP_7 is fed to a corresponding or gate 50. Also, each respective line of lines BP_0-BP_7 is fed to another input of the corresponding or gate 50. Taking backplane 46 of FIG. 7 as an example, all of lines BP_0-BP_7, except for line BP_2, are at logic one, while line BP_2 is at logic zero. Thus, the outputs of all of or gates 50, except for or gate 50c, will always be logic one, while the output of or gate 50c will vary in accordance with input SEL_BP_2. If, and only if, SEL_BP_2 is logic zero will the output of or gate 50c be logic zero. Thus, backplane-addressed signal BP_ADDR, the output of nand gate 52, will be logic zero when SEL_BP_2 is logic one, and logic one when SEL_BP_2 is logic zero.

A similar analysis applies to all other backplanes. Therefore, signal BP_ADDR of each respective backplane can be used to determine if that respective backplane is being addressed at any particular time. Thus, each backplane in a connected group is automatically made responsive to an address corresponding to the position of that backplane within the group, without the need for manual setting of jumpers, switches, thumbwheels, etc.

Optionally, an external processor having an interface compatible with the present system can be included in the system by connecting the processor, via that interface, to the left side connector of a first backplane. This external processor presents a logic zero on pin 19 of the interface, which, being connected to pin 19 of J1 of the first backplane, causes the BP_1 line of the first backplane to be logic zero. Thus, the first backplane will behave as if a master unit having address 0 is connected to left connector J1 of the first backplane, similar to the behavior described above. In such a configuration, one fewer backplane can be accommodated than would be the case if a backplane including a processor module had been used as a master backplane.

In another embodiment of the present invention, units, not compatible with the above-mentioned automatically addressed units, are connected together via an interface having pass-through capability, such as the IEEE 1284 Enhanced Parallel Port (EPP). The IEEE 1284 standard (Institute of Electrical and Electronics Engineers, New York, N.Y.) is included by reference as if fully set forth herein. Such units are therefore referred to herein as "enhanced" units. Although this discussion refers to units, the system discussed here can optionally be implemented with unenclosed backplanes or a mixture of units and unenclosed backplanes, and such an implementation is included within the scope of the present invention. Use of the EPP is facilitated by commercially available transceivers, such as, for example, Fairchild 74VHC161284. Although this interface is not compatible with the automatically addressed units described above, this interface allows enhanced units to be connected with inexpensive, readily available standard EPP cables, which can each be up to ten meters in length. Thus, in a system capable of addressing a maximum of eight enhanced units, the system can control devices in a region up to seventy meters in length.

Although this description refers to the use of the EPP interface and EPP cables, other such interfaces and cables can be used to implement similar embodiments of the present invention, and are included in the scope of the present invention.

Figure 9:
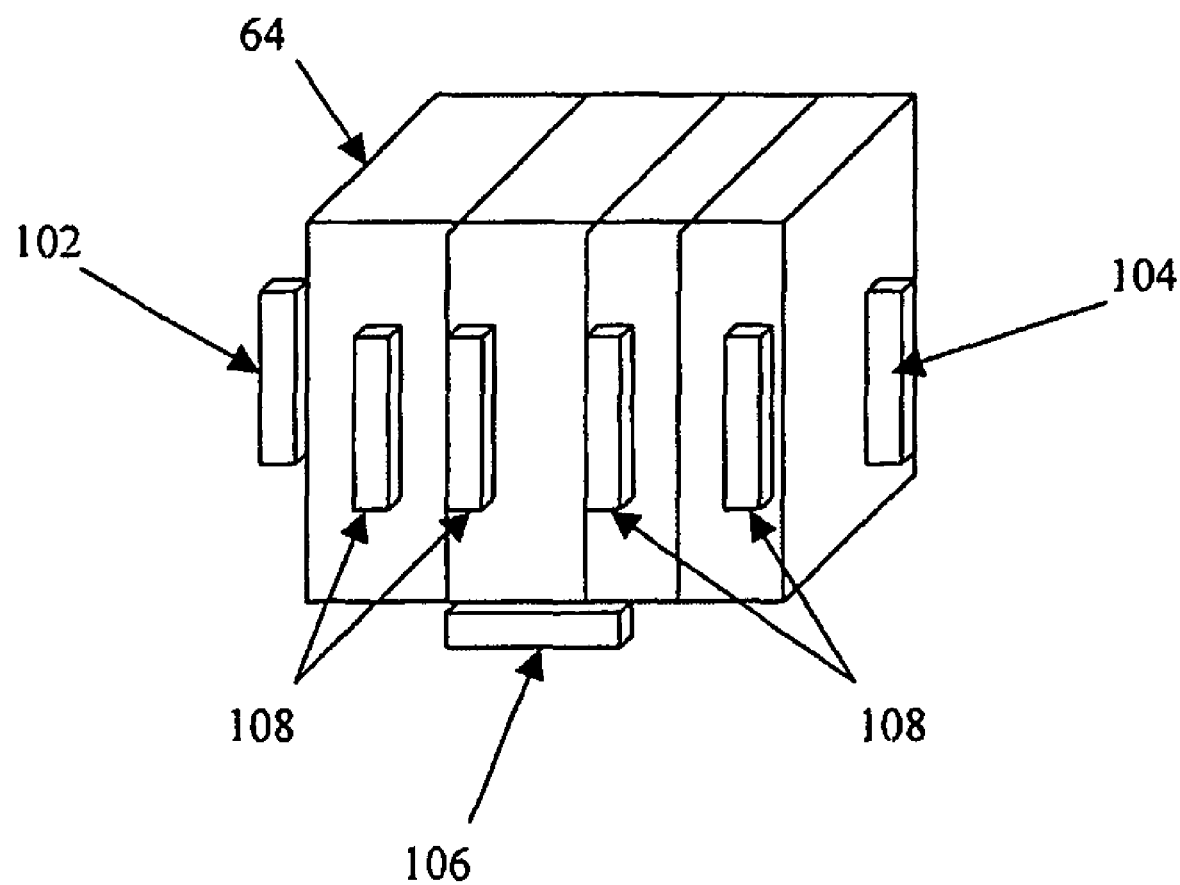
FIG. 9 illustrates schematically an example of an enhanced unit according to the present invention.
Figure 10:
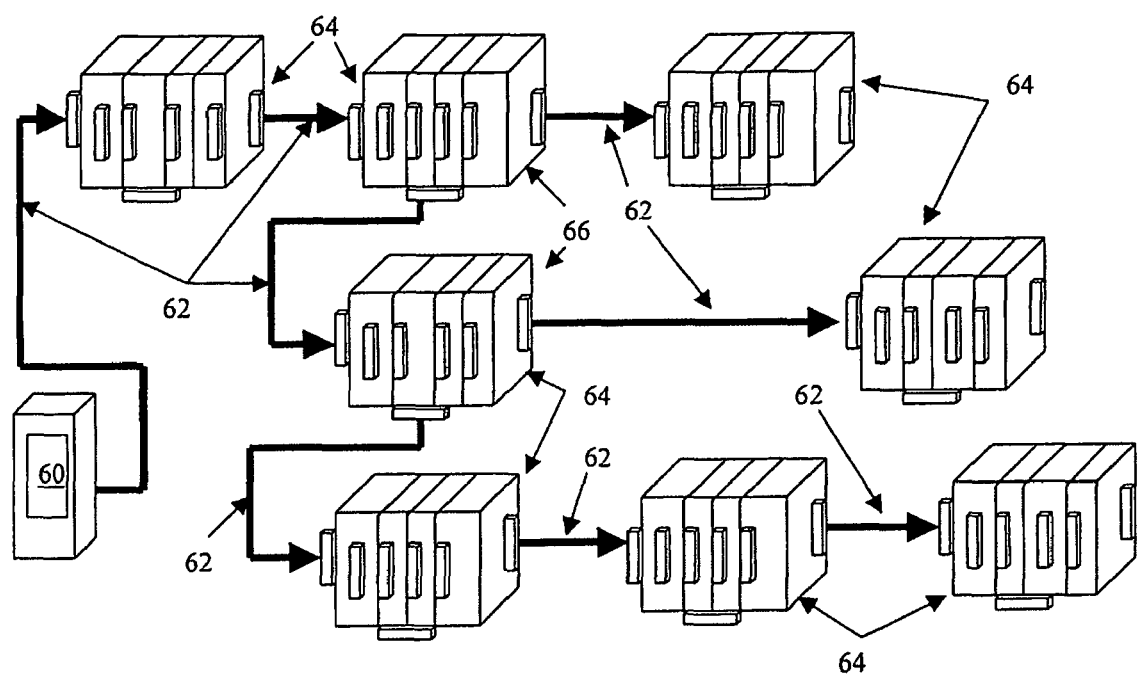
FIG. 10 illustrates schematically several enhanced units according to the present invention connected to a host.
Figure 11:
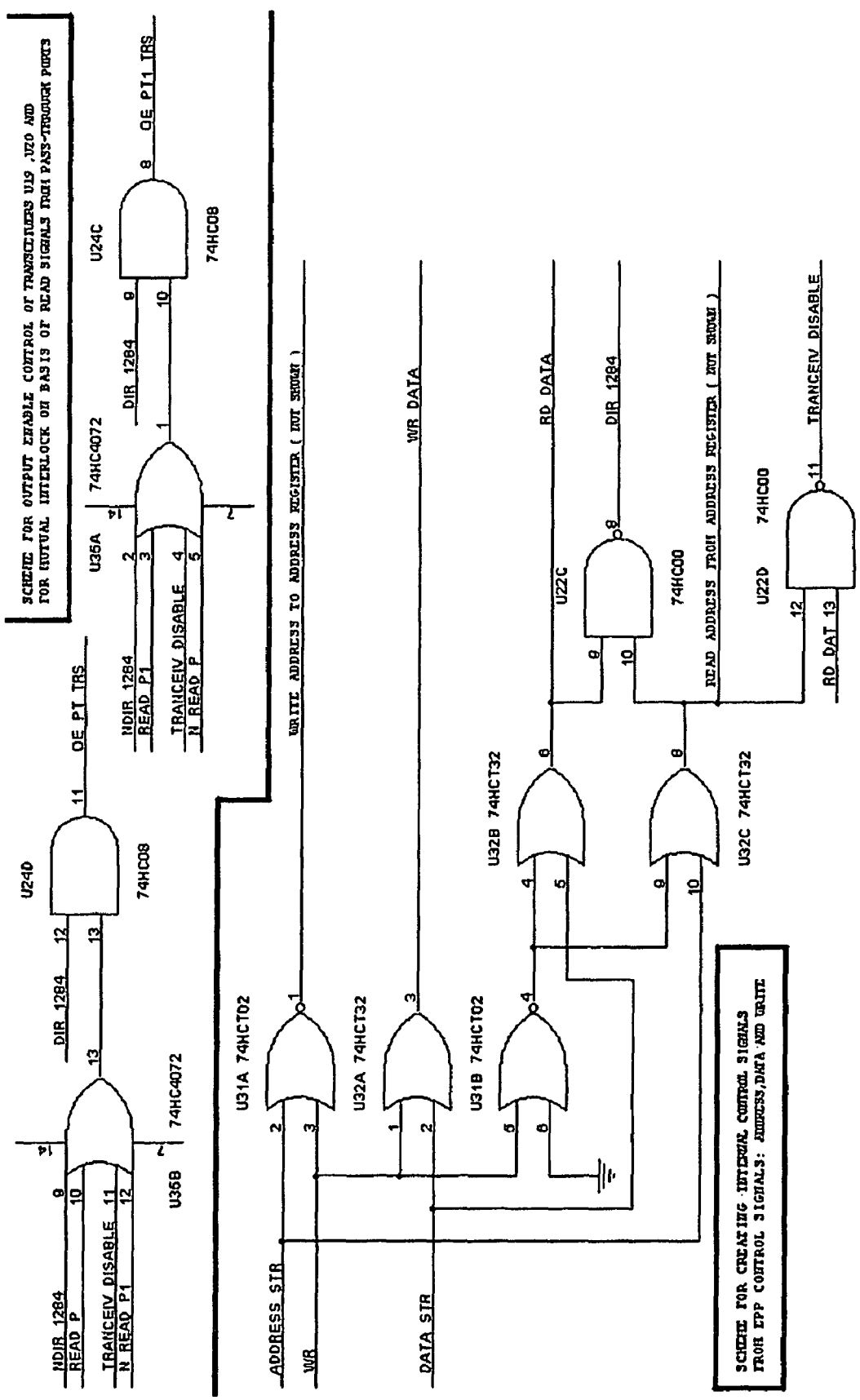
FIG. 11 is a schematic diagram of circuitry for an enhanced backplane for producing signals operative to prevent two enhanced backplanes from driving signal lines simultaneously and circuitry for producing internal control signals from EPP signals.
Figure 12:
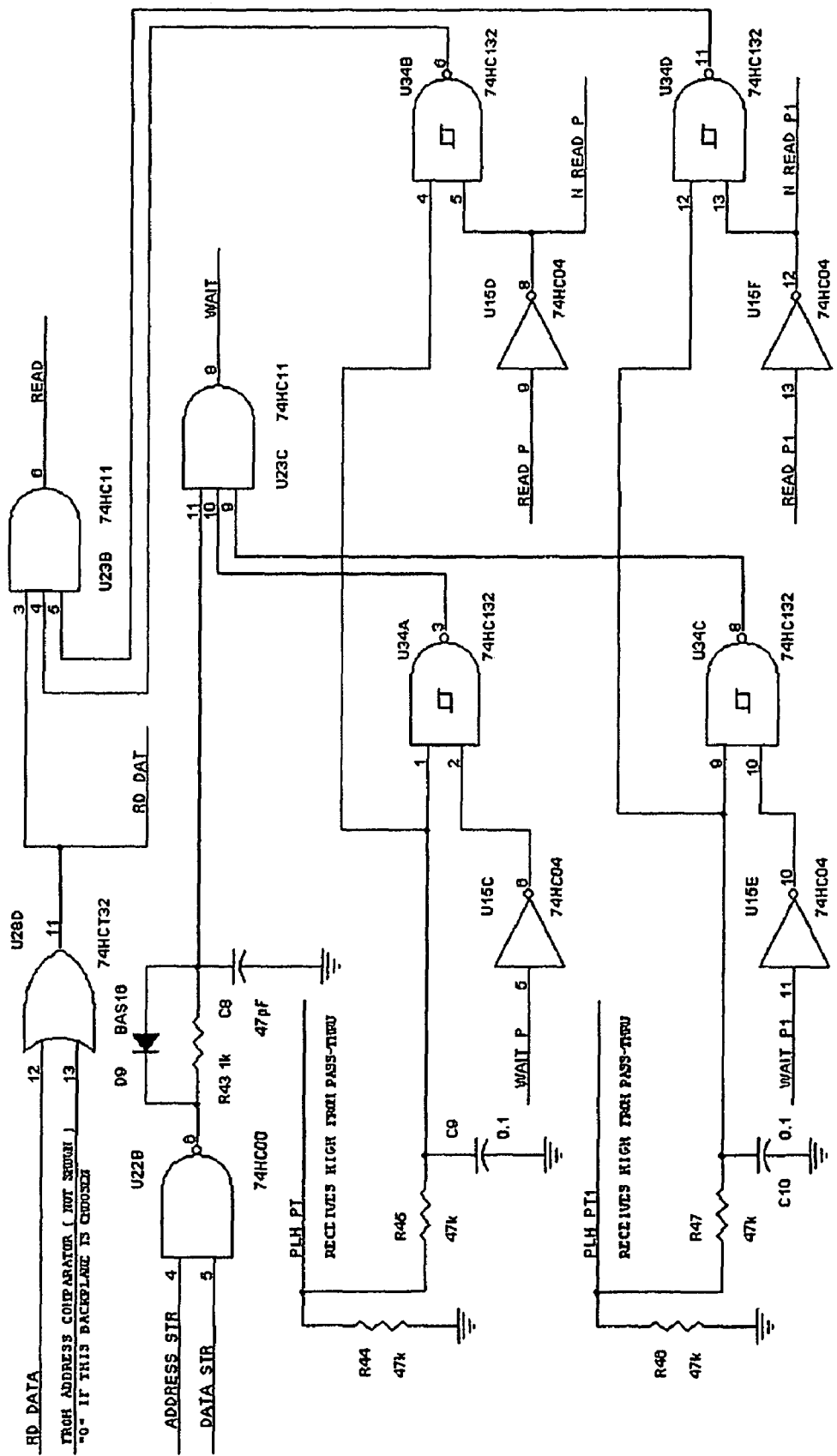
FIG. 12 is a schematic diagram of circuitry operative to produce READ and WAIT signals for an enhanced backplane.
Figure 13:
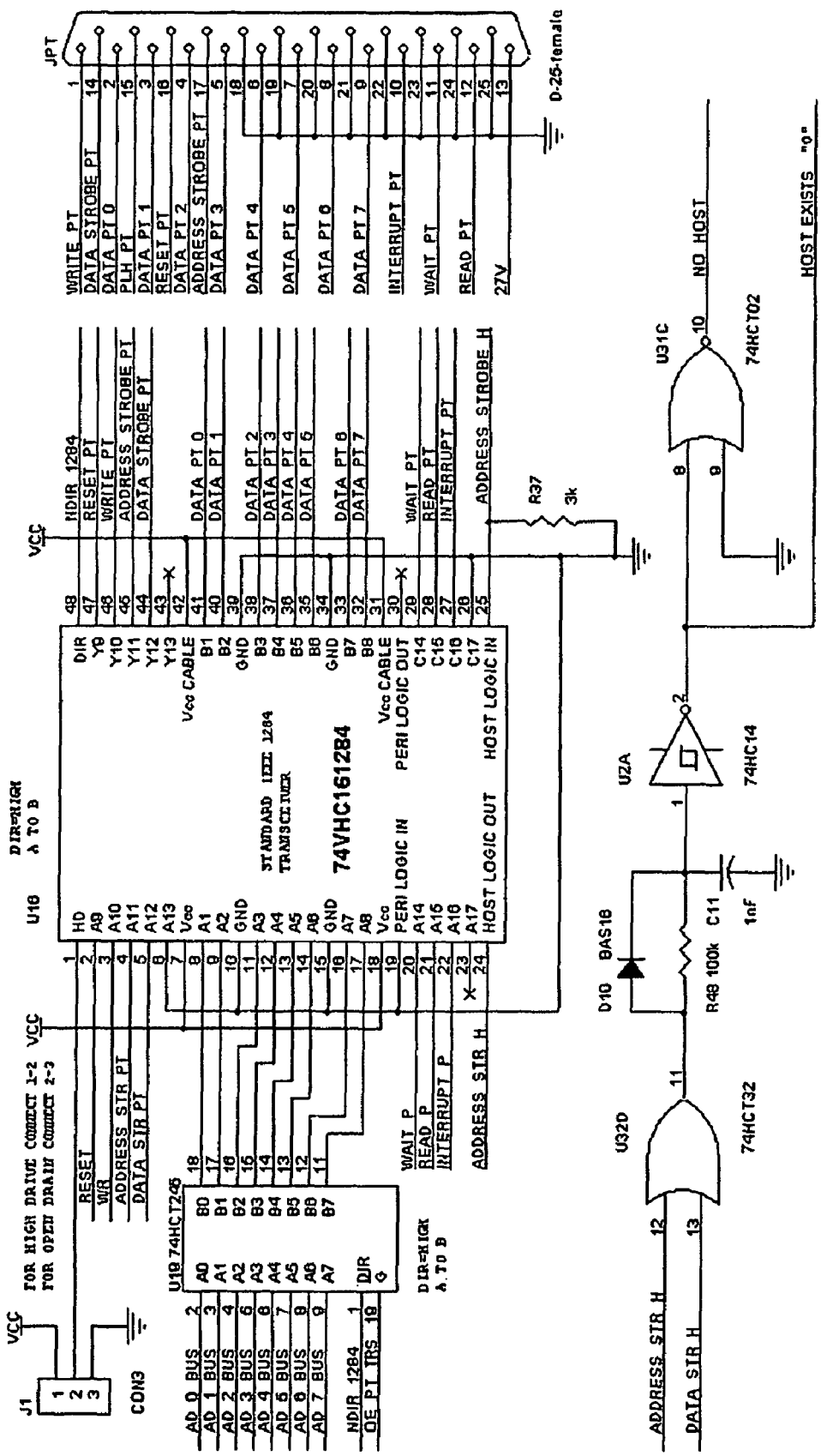
FIG. 13 is a schematic diagram of circuitry for an enhanced backplane operative to control a first pass-through port and to detect existence of a host.
Figure 14:
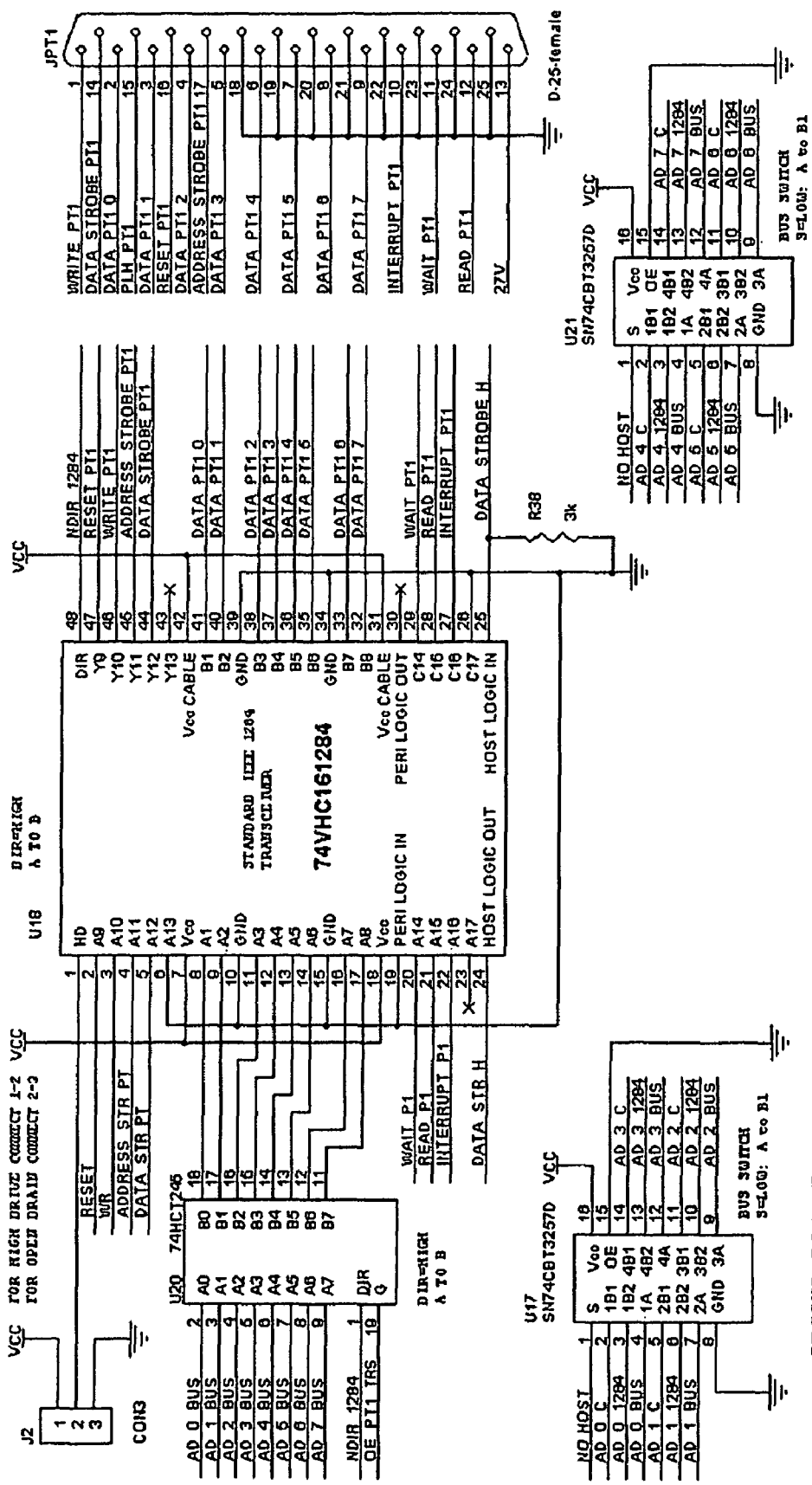
FIG. 14 is a schematic diagram of circuitry for an enhanced backplane operative to control a second pass-through port and to generate signals operative to control an internal address/data bus.
Figure 15:
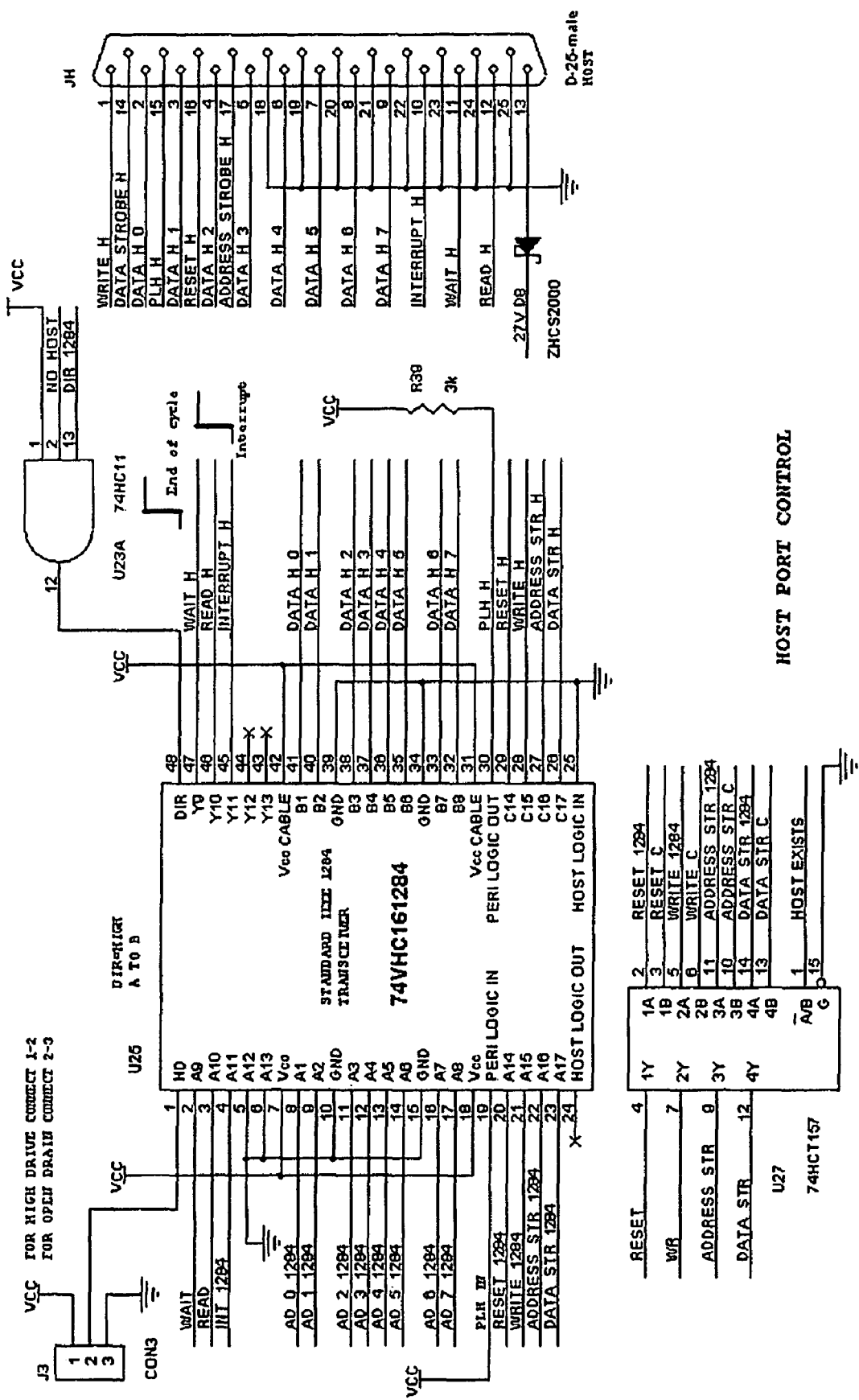
FIG. 15 is a schematic diagram of circuitry for an enhanced backplane operative to control a host port and to select whether to use backplane control signals from a host or from a processor associated with the backplane.

As illustrated schematically in FIG. 9, an enhanced unit 64 has a host port 102, and can have more than one pass-through port, such as a first pass-through port 104 and a second pass-through port 106, allowing for a "star" type connection, as illustrated schematically in FIG. 10. This capability of having more than one pass-through port is not part of the IEEE 1284 standard, but is rather an extension thereof included in the present invention. A host port 102 of an enhanced unit 64 is operative to be connected, optionally, to a host computer 60 or to a pass-through port, 104 or 106, of another enhanced unit 64. In this case, logic added to the EPP interfaces in any enhanced unit 64 that is a star-connected enhanced unit 66 is operative to select which pass-through port, 104 or 106, is operational at any given time, according to address information provided by, in this illustrative example, host computer 60, using spare lines present in EPP cables 62 and corresponding spare pins of pass-through ports 104 and 106. These spare lines are not dedicated to any particular use by the EPP standard, and are thus available for this specialized use.

More specifically, pins 12, 13 and 15 of the 25-pin EPP connector, which are uncommitted in the IEEE 1284 standard, are utilized in the present invention to facilitate power distribution and to facilitate the use of more than one pass-through port on an enhanced backplane. This particular choice of pins is non-limiting, and it will be appreciated by those skilled in the art that other choices of uncommitted pins for this purpose can be made. All such choices are within the scope of the present invention.

Pin 13 is used to distribute power to the enhanced units at a higher voltage than is typical of logic power supplies.

For example, pin 13 can be used to distribute a 27 volt supply. It is advantageous to use a higher voltage in this application because distribution of power over long distances through wires of limited thickness is more efficient at higher voltages. Also, some devices, such as some types of relays, that are included in the enhanced units, require higher voltage than the 5 volts typically used by logic circuits. A single line can thus be used to distribute power to several connected units, with regulators in each enhanced unit providing power at other voltages, such as the 5 volts typically used by logic circuits.

Because the host connector of an enhanced unit can be connected to a parallel port of a host computer, it is preferable that a diode be included in series with pin 13 of the host connector of an enhanced unit, the diode being operative to block the high voltage from entering the parallel port of the host computer. In this situation, if several enhanced units are connected, only the enhanced unit closest to the host computer need have a power supply connected to the mains or other source of power, the other enhanced units drawing power from pin 13. In a configuration without a host computer, the master enhanced unit can similarly supply power to the other enhanced units.

FIGS. 11, 12, 13, 14 and 15 schematically represent an illustrative and non-limiting implementation of an enhanced backplane according to the present invention. Pin 15 of EPP connectors JH, JPT and JPT1 is used to carry a signal called Peripheral Logic High (PLH). Pin 12 of the EPP connector is used to carry a signal called READ.

Because the enhanced backplane has two pass-through ports, in contrast with the IEEE 1284 standard, which only accommodates one pass-through port, additional logic is used, to properly control operation of dual pass-through ports.

Respective isolation transceivers U19 and U20, connected to corresponding IEEE 1284 pass-through port transceivers U16 and U18, are operative to connect to the internal address/data bus only the IEEE 1284 transceiver that is needed for the current cycle.

The enhanced backplane does not have automatic address detection circuitry and instead uses a digital comparator to selectively enable individual backplanes.

The PLH signal is operative to inform the host or higher level unit that there a peripheral, or lower level, unit is connected, so as to allow for correct generation of WAIT and READ signals in the higher level enhanced backplane. The relevant circuitry includes U22B, U23B, U23C, U34, U15C, U15E, U15D and U15F.

If no peripheral unit is connected to a particular pass-through port, JPT or JPT1, pin 15 of that pass-through port will be pulled to ground by a resistor, R44 or R46, corresponding to that pass-through port. Therefore, the output of a corresponding nand gate U34A or U34C will be at a high logic level, so that the wait signal, WAIT_P or WAIT_P1, from that pass-through port will have no influence on the WAIT signal generated on the output of U23C.

If a peripheral unit is connected to a particular pass-through port JPT or JPT1, a logic high signal PLH_H on the host connector JH of that peripheral unit will be operative to set pin 15 of that pass-though port, JPT or JPT1, to a high logic level. Therefore, the output of the corresponding nand gate U34A or U34C will be equal to the corresponding wait signal, WAIT_P or WAIT_P1, from that peripheral unit, and the WAIT signal generated on the output of U23C will reflect activity on that peripheral unit properly.

Because there is no specific signal in the 25-pin version of the IEEE 1284 interface operative to inform peripheral devices, the system of the present invention establishes the existence of a host by making use of the fact that the address strobe and data strobe signals are never both low at the same time.

The address strobe signal from the host, ADDRESS_STROBE_H, and the data strobe signal from the host, DATA_STROBE_H, are connected to the HOST LOGIC IN inputs of transceivers U16 and U18, respectively. These inputs are chosen because they do not have internal pull-up resistors. Thus, in the absence of a host connected to JH, pulldown resistors R37 and R38 cause these inputs to be zero. The HOST LOGIC OUT outputs of transceivers U16 and U18 follow their respective inputs. The HOST LOGIC OUT output, ADDRESS_STR_H, of transceiver U16, and the HOST LOGIC OUT output, DATA_STR_H, of transceiver U18 serve as inputs to or gate U32D. If no host is connected to JH, both inputs to or gate U32D will always be zero, so the output of U32D will always be zero. If a host is connected to JH, at least one of signals ADDRESS_STR_H and DATA_STR_H will be high at any given time, so the output of U32D will always be high. The output of U32D, via a network including D10, R48 and C11, and an inverter U2A, drives the signal HOST_EXISTS, which is operative to control multiplexer U27. Multiplexer U27 is thus operative to cause the enhanced backplane to respond to the RESET, WR, ADDRESS_STR and DATA_STR signals of the host if a host is connected to JH, and to the RESET, WR, ADDRESS_STR and DATA_STR signals of a processor associated with the enhanced backplane if no host is connected to JH.

Nor gate U31C is operative to invert the HOST_EXISTS signal producing a NO_HOST signal that is used to operate bus switches U17 and U21. These switches commutate internal address/data bus AD_0-BUS-AD_7_BUS to processor address/data bus AD_0_C-AD_7_C if no host is connected to JH, or to address/data bus AD_0_1284-AD_7_1284 from host transceiver U25 if a host is connected to JH.

Because the EPP standard does not have sufficient lines to allow the use of the automatic addressing scheme described above, addresses for enhanced units 64 connected via EPP are determined by such mechanisms as switches or thumbwheels (not shown).

According to the present invention, isolation transceivers U19 and U20, together with the READ signal provided on pin 12 of the modified EPP interface, are operative to prevent damage that might result if multiple enhanced backplanes in a system are set to the same address and a read operation is performed on that address. Such a read operation could lead to isolation transceivers U19 and U20 both attempting to drive data lines at the same time. Because the outputs of U19 and U20 are low impedance, large, damaging currents can occur if one output attempts to drive a line high at the same time as another output attempts to drive that same line low, or incorrect data placed on the bus.

If this enhanced backplane is addressed, and the active-low RD_DATA signal is low, indicating an attempt to perform a read operation on the enhanced backplane, output 11 of or gate U28D will be low. If signal PLH_PT is high, indicating the presence of a unit connected to pass-through port JPT, and signal READ_P is low, indicating an attempt to perform a read operation on a unit connected via pass-through port JPT, output 6 of U34B will be low. If signal PLH_PT1 is high, indicating the presence of a unit connected to pass-through port JPT1, and signal READ_P1 is low, indicating an attempt to perform a read operation on a unit connected via pass-through port JPT1, output 11 of U34D will be low. Thus, any attempt to perform a read on the enhanced backplane or on any unit connected to a pass-through port of the enhanced backplane will cause the active-low READ signal on output 6 of and gate U23B to be low, and thus READ signal will be propagated to any unit connected to host connector JH.

Signal OE_PT_TRS on output 11 of U24D is operative to enable outputs of isolation transceiver U19 only if a read is attempted on a unit connected via pass-through port JPT, and no read is being attempted on this enhanced unit, and no read is being attempted on any unit connected via pass-through port JPT1. Signal OE_PT1_TRS on output 8 of U24C is operative to enable outputs of isolation transceiver U20 only if a read is attempted on a unit connected to pass-through port JPT1, and no read is being attempted on this enhanced unit, and no read is being attempted on any unit connected via pass-through port JPT. Thus, accidental driving of lines by both U19 and U20 at the same time is prevented.

The system with enhanced units can be operated from a host computer via an EPP port directly, without the need for an additional processor because the EPP backplane itself is capable of performing EPP protocol communication with the computer.

Optionally, the system can be configured without a host computer, in which case the leftmost enhanced unit must include a processor, and this leftmost enhanced unit will act as a master enhanced unit.

Optionally, a host computer can be connected to the enhanced system of the present invention via, for example, an Ethernet connection, in which case the leftmost unit of the system requires a processor operative to interface to the Ethernet connection. Such a configuration allows for the host to be at a much larger distance from the system than the distance allowed by an EPP connection.

As enhanced units are not compatible with the automatically addressed units discussed above, it is preferable that the connectors on the two types of units (or backplanes) be chosen so as to discourage accidental connection of incompatible units. For example, automatically addressed units can have female connectors on the left side, and male connectors on the right side, while enhanced units can have male host connectors on the left side, and female pass-through connectors on the right side and on the bottom.

Although it is not strictly necessary to use pin 18 of connector J2 of automatically addressed backplanes, it is preferable that the presence of a ground signal on this pin be operative to disable the bus of any processor mounted on the automatically addressed backplane, so as to prevent damage to the system if an automatically addressed backplane is accidentally connected to an enhanced backplane. Pin 18 of the EPP interface is grounded. Thus, if such an accidental connection occurs, pin 18 of connector J2 of the automatically addressed backplane will be connected to pin 18 of a connector of the enhanced backplane, and thus forced to ground, causing the bus of any processor mounted on the automatically addressed backplane to be disabled.

Figure 16:
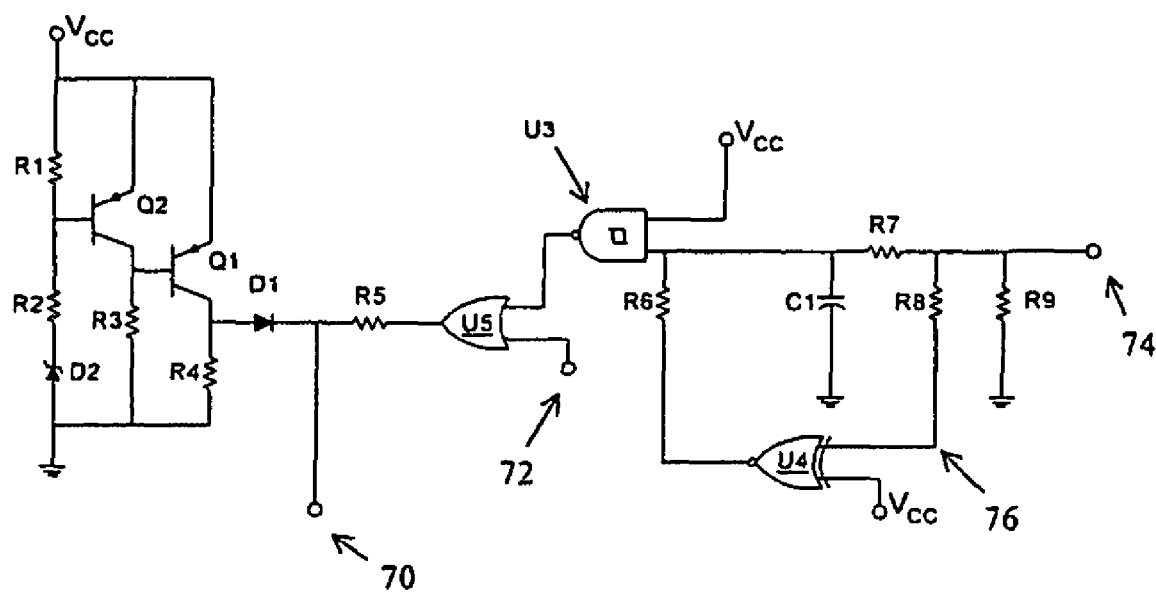
FIG. 16 illustrates schematically circuitry operative to delay the enabling of an interface to a module until the power supply of the module has stabilized.

An important capability for an industrial control system is live insertion. Stopping industrial equipment for maintenance or upgrades costs production time, and thus it is desirable to avoid such stoppages when possible. Backplanes of the system of the present invention are specifically designed to allow the removal and insertion of modules while the system is powered. FIG. 16 illustrates schematically circuitry operative to delay the enabling of an interface to a module until the power supply of the module has stabilized. This protects the system from erroneous signals from the module that might be present during while the power supply of the module is being turned on. In addition, by keeping the data, address and control lines of the module interface disabled when no module is present, this circuitry prevents accidental shorting of these lines from damaging the system.

Referring now to FIG. 16, which schematically illustrates circuitry within the system operative to disable the system interface to a module unless the power supply of that module is stable, an output 70 is operative to enable tri-state outputs of the system interface to the module when output 70 is in a low logic state, and operative to disable, i.e., set to a high-impedance state, those same tri-state outputs when output 70 is in a high logic state. When power is applied to the system, the supply voltage $V_{CC}$ takes a short amount of time to rise to a final value. During this time, circuitry including transistors Q1 and Q2, diode D1, zener diode D2, and resistor R5 is operative to keep output 70 at a high logic level, regardless of the output of or gate U5. While $V_{CC}$ is less than the voltage at which zener diode D2 conducts, transistor Q2 does not conduct, and current flows from the base of transistor Q1 through resistor R3, causing transistor Q1 to conduct. Current from transistor Q1 flows through diode D1, and resistor R5 ensures that output 70 will be close to $V_{CC}$, even if or gate U5 has a low logic level output. Therefore, the above-mentioned tri-state outputs will be disabled during this interval, preventing modules from presenting erroneous information to the system, or receiving erroneous information from the system, during system power-up.

It is preferable, but not necessary, that diode D1 be a diode having a low forward voltage drop, such as a Schottky diode.

When $V_{CC}$ has risen to a value sufficient to cause zener diode D2 to conduct, current will flow from the base of transistor Q2 through zener diode D2 and resistor R2, causing transistor Q2 to conduct, reducing the voltage across the base-emitter junction of transistor Q1, thus causing transistor Q1 to stop conducting. Therefore, diode D1 will be reverse-biased, and the voltage at output 70 will be determined by the output of or gate U5.

In a 5-volt system, it is recommended that zener diode D2 have a zener voltage within the range of 3.3 volts to 3.9 volts.

Consider now the functioning of the circuit of FIG. 16 after $V_{CC}$ of the system has stabilized. A voltage feedback terminal 74 is operative to be connected to a power supply line of an inserted module when the module is inserted into the backplane. This feedback signal, and circuitry including gates U3, U4 and U5 insure that output 70 will enable the module only after an appropriately selected time delay. When there is no module present, resistor R9, which has a resistance much smaller than the resistance of resistor R7, is operative to reduce the voltage at an input 76 of open-drain equivalence gate U4 to a low logic level, causing the output of U4 to be at a low logic level, ensuring that capacitor C1 is discharged, and causing nand gate U3 to set output 70 to a high logic level, via or gate U5 and resistor R5. Resistor R6 is operative to discharge capacitor C1 when no module is present. Nand gate U3 preferably, but not necessarily, is a nand gate exhibiting hysteresis, such as a Schmitt-trigger nand gate.

When a module is inserted into the system, causing voltage feedback terminal 74 to rise to a high logic level, input 76 of equivalence gate U4 also rises to a high logic level, causing the output of equivalence gate U4 to be in an open-drain state. This allows capacitor C1 to be charged by module feedback terminal 74 via resistor R7. After capacitor C1 has charged sufficiently, the output of nand gate U3 drops to a low logic level. When the output of nand gate U3 is at a low logic level, the output of or gate U5 is a function of a signal applied to a module select terminal 72, and the system interface to the module is enabled or disabled accordingly.

When a module is removed, module feedback terminal 74 is disconnected, the voltage at input 76 of equivalence gate U4 is pulled to zero by R9, causing the output of equivalence gate U4 to also be zero. Capacitor C1 is thus rapidly discharged via R6, causing the output of U3 to be high, in turn causing the output of U5 to be high, disabling the interface of the unit to the module.

Disabling outputs of the system interface to the module when no module is present serves to protect against accidental shorting of those outputs by, for example, accidental contacting of tools with an empty module socket. It will be readily apparent to those skilled in the art that other logic designs can perform substantially equivalent functions, and such designs are within the scope of the present invention.

Recommended values, in ohms, for the resistors in the circuit of FIG. 16 include:

| | |
|---|---|
| R1 | 30,000 |
| R2 | 2,000 |
| R3 | 4,990 |
| R4 | 4,990 |
| R5 | 2,000 |
| R6 | 2,000 |
| R7 | 2,000,000 |
| R8 | 10,000 |
| R9 | 10,000 |

A recommended value for capacitor C1 is 0.22 microfarad.

A non-limiting example of a circuit suitable for use as U4 is Texas Instruments SN74HC266.

The time delay provided by the above-mentioned circuitry is on the order of C1 times R7. With the above recommended values for these components, the delay is on the order of 0.44 second.

Figure 17:
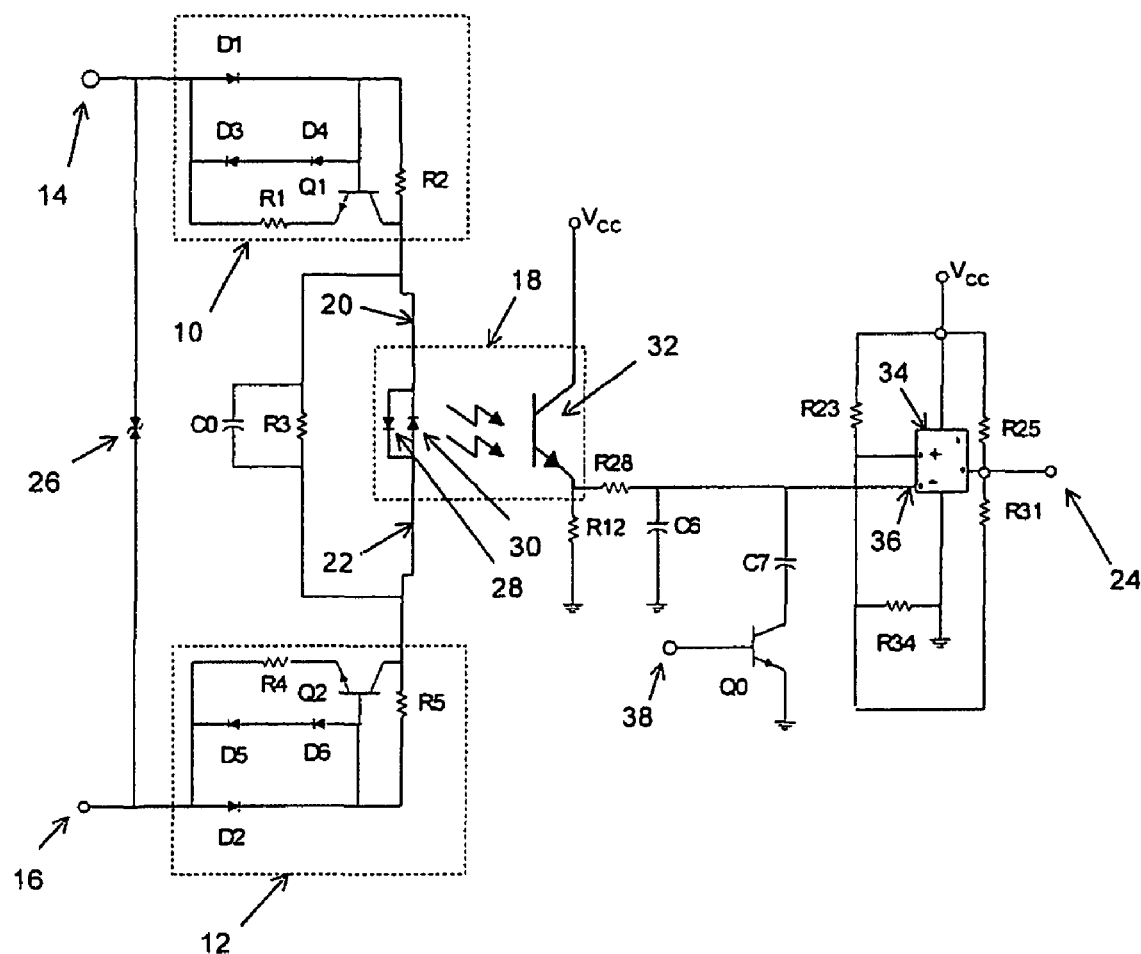
FIG. 17 illustrates schematically a sensor according to the present invention capable of detecting an AC or DC input voltage and providing optical isolation.

In a factory environment it is often desirable to be able to detect the presence of a voltage having an absolute value exceeding a particular threshold value, without regard to the polarity of the voltage. This voltage may be AC or DC. According to the present invention there is provided a mechanism for sensing such voltages over a wide range of voltages, and with optical isolation of the input voltage from the control system. This ability to accommodate a wide range of input voltages is highly desirable, as it allows interfacing with a variety of external equipment without having to stock a large variety of sensors. As an illustrative example, FIG. 17 illustrates schematically a sensor capable of detecting an input voltage impressed across input terminals 14 and 16 and providing an optically isolated signal, suitable for use by the control system, at a terminal 24. A DC voltage, regardless of polarity, of at least a threshold voltage determined by the parameters of the components of the circuit of FIG. 17, or an AC voltage of at least a threshold voltage also determined by the parameters of the circuit of FIG. 17, will be detected by this sensor. The maximum safe voltages that can be applied are determined by the parameters of the components of the circuit of FIG. 17. The maximum safe voltages can be an order of magnitude, or more, greater than the threshold voltages.

An optional transient voltage suppressor 26 is connected across terminals 14 and 16 to protect the sensor from overvoltages.

Current-limiting circuitry, shown within dashed boxes 10 and 12, is operative to allow the flow of current sufficient to operate light emitting diodes 28 and 30 of an optocoupler, shown within a dashed box 18, at low input voltages, and to limit current flow through diodes 28 and 30 at high input voltages.

When terminal 14 is positive with respect to terminal 16, diodes D5 and D6, together with resistors R4 and R5, bias a transistor Q2 so as to act as a current limiter. At the same time, a diode D1 acts to reverse-bias a transistor Q1, allowing current to flow through a resistor R1, supplementing the current flowing through a diode D1 and resistor R2.

Similarly, when terminal 14 is negative with respect to terminal 16, diodes D3 and D4, together with resistors R1 and R2, bias transistor Q1 so as to act as a current limiter. At the same time, a diode D2 acts to reverse-bias transistor Q2, allowing current to flow through resistor R4, supplementing the current flowing through a diode D2 and resistor R5.

An optional RC filter including a capacitor C0 and a resistor R3 is operative to smooth current flow through light emitting diodes 28 and 30.

A comparator 34 is configured, by use of resistors R23, R25, R31 and R34, to operate as a Schmitt trigger. When either of light emitting diodes 28 and 30 emits light, phototransistor 32 conducts a current operative to increase the voltage at a negative input terminal 36 of comparator 34. When terminal 36 is driven sufficiently high, output 24 will be driven low, and when terminal 36 is driven sufficiently low, output 24 will be driven high.

A resistor R28 and a capacitor C6 act as an RC filter to smooth the output of phototransistor 32. An additional capacitor C7, typically having much greater capacitance than capacitor C6, is switched by a transistor Q0 according to a delay control signal applied to a terminal 38. The additional delay afforded by capacitor C7 is useful when the input voltage applied to terminals 14 and 16 is noisy, and particularly useful when the input voltage applied to terminals 14 and 16 is a power-line frequency AC voltage, ensuring that the output at terminal 24 remains stable during zero-crossings of the input signal AC voltage. It is a particular advantage of the present invention that capacitor C7 can be switched in or out of the circuit, under software control via terminal 38, so that the delay can be reduced to allow fast response to DC input signals and increased to eliminate unwanted transitions at output terminal 24 due to noisy DC signals or zero-crossings of AC signals.

The above-mentioned filtering, together with the hysteresis of the Schmitt trigger, help to produce a stable output at terminal 24 even with AC or noisy DC input voltages across terminals 14 and 16.

An input circuit as described above allows for a wide range of input voltages with a small range of input currents. In the circuit of FIG. 17, an input of 4 volts DC produces a current of 1.3 mA, while an input of 60 volts DC produces a current of 3.5 mA. Thus, in this example, multiplication of input voltage by a factor of 15 multiplies input current by a factor of only 2.7.

The circuit elements of the sensor of FIG. 17 can be altered so as to accommodate a variety of input voltage ranges and to provide other filtering characteristics, and such alterations are within the scope of the present invention.

The particular topology of the sensor of FIG. 17 is presented only by way of example, and many variations on this topology can be made. Such variations are within the scope of the present invention.

Figure 18:
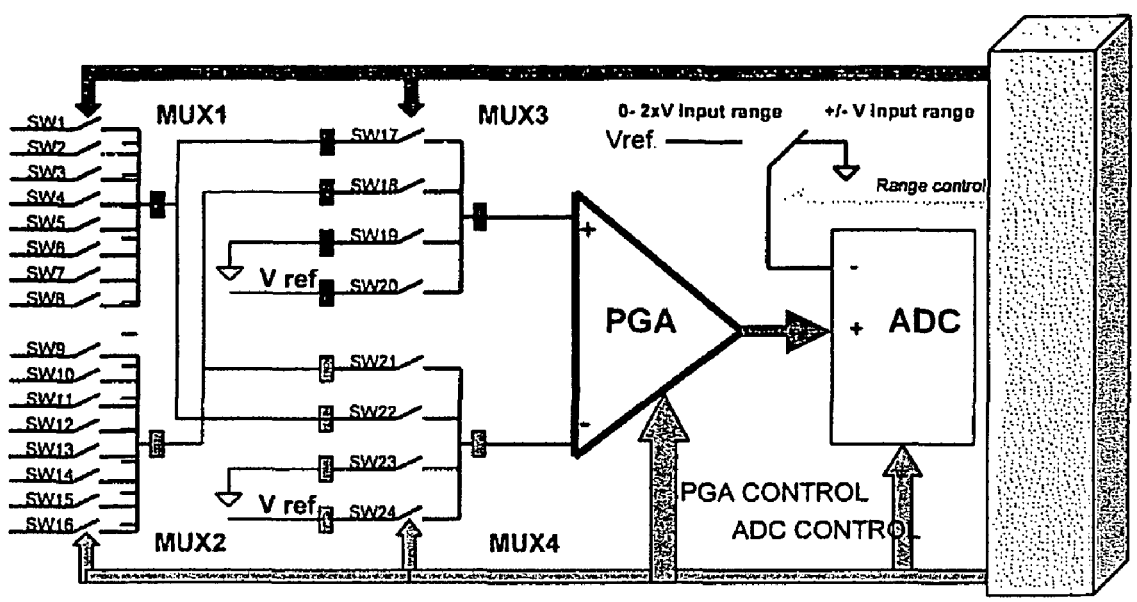
FIG. 18 illustrates schematically an analog input submodule according to the present invention.

According to the present invention, there is provided a submodule operative to measure analog voltages in a flexible manner. Referring now to FIG. 18, a programmable gain amplifier PGA having positive and negative inputs is operational to feed a positive input of an analog to digital converter ADC. A negative input of ADC is connected, under software control, to either ground or a reference voltage Vref. The positive input of PGA is connected to the output of a 4-to-1 analog multiplexer MUX3. The negative input of PGA is connected to the output of a 4-to-1 analog multiplexer MUX4. Each of multiplexers MUX3 and MUX4 has inputs from a first N-to-1 analog multiplexer MUX, a second N-to-1 analog multiplexer MUX2, reference voltage Vref, and ground. This combination of multiplexers allows for a wide range of choices for each of the inputs of PGA, including calibration and zeroing inputs, and single-ended and differential inputs.

When the negative input to ADC is ground, ADC will respond to input voltages at the positive input of ADC within the normal measurement range of ADC. When the negative input of ADC is connected to reference voltage Vref equivalent to the positive full-range voltage of ADC, ADC will respond to voltages ranging from zero to twice the full-range input voltage of ADC While specific values have been suggested for some components of the present invention, it will be appreciated by those skilled in the art that these are only suggestions, and that significant variations in these component values can be made. Such variations are within the scope of the present invention.

While the invention has been described with respect to a limited number of embodiments, it will be appreciated that many variations, modifications and other applications of the invention may be made.

What is claimed is:

1. A control system comprising:
    (a) a submodule including:
        (i) a first input terminal;
        (ii) a second input terminal;
        (iii) a first light source having a corresponding anode and having a corresponding cathode, said first light source operative to emit light when said anode of said first light source is positive with respect to said cathode of said first light source;
        (iv) a second light source having a corresponding anode and having a corresponding cathode, said second light source operative to emit light when said anode of said second light source is positive with respect to said cathode of said second light source;
        (v) an optical detector operative to detect light emitted by said first light source and operative to detect light emitted by said second light source, and further operative to output a signal upon detection of light, and
        (vi) two current limiters,
    and wherein said anode of said first light source is connected to said cathode of said second light source at a first junction, and wherein said cathode of said first light source is connected to said anode of said second light source at a second junction, and wherein a first said current limiter is connected serially between said first input terminal and said first junction and wherein a second said current limiter is connected serially between said second input terminal and said second junction, said submodule being operative to detect a voltage difference between said first input terminal and said second input terminal regardless of polarity; and
    (b) an interface,
    and wherein said submodule is operative to be connected to an external device via said interface, and wherein said interface is operative to be connected, at any particular time, to a said submodule chosen from a plurality of said submodules.

2. The system of claim 1, wherein a said current limiter is characterized by having a current vs. voltage characteristic having a slope that decreases in absolute value for increasing absolute value of voltage across said current limiter for some range of voltages across said current limiter.

3. The system of claim 1, wherein said submodule further includes:
    (vii) a capacitor, and
    (viii) a switch,
    said capacitor being operative to filter said output of said optical detector, and said switch being connected in series with said capacitor and operative to control said filtering.

4. The system of claim 1, wherein said submodule includes:
    (i) a first analog multiplexer operative to multiplex a first plurality of inputs;
    (ii) a second analog multiplexer operative to multiplex a second plurality of inputs;
    (iii) a third analog multiplexer operative to multiplex an output of said first analog multiplexer, an output of said second analog multiplexer, a reference voltage and ground;
    (iv) a fourth analog multiplexer operative to multiplex an output of said first analog multiplexer, an output of said second analog multiplexer, a reference voltage and ground;
    (v) an amplifier having a positive input and a negative input, and
    (vi) an analog to digital converter,
    and wherein said positive input of said amplifier is connected to an output of said third analog multiplexer and said negative input of said amplifier is connected to an output of said fourth analog multiplexer, and wherein an input of said analog to digital converter is connected to an output of said amplifier.

5. The system of claim 1, wherein said interface includes:
    (i) a first submodule connector operative to accept a said submodule;
    (ii) a second submodule connector operative to accept a said submodule;
    (iii) a third submodule connector operative to accept a said submodule, and
    (iv) a field connector operative to connect to at least one external device, and wherein a first terminal of said field connector is connected to a first terminal of said first submodule connector and to a first terminal of said third submodule connector, and wherein a second terminal of said field connector is connected to a third terminal of said first submodule connector and to a second terminal of said third submodule connector, and wherein a third terminal of said field connector is connected to a first terminal of said second submodule connector and to a third terminal of said third submodule connector, and wherein a fourth terminal of said field connector is connected to a third terminal of said second submodule connector and to a fourth terminal of said third submodule connector and wherein at least two terminals selected from the group consisting of a second terminal and a fourth terminal of said first submodule connector and a second terminal and a fourth terminal of said second submodule connector are connected to each other and to a fifth terminal of said field connector.

6. The system of claim 5, wherein said submodule includes:
(i) a first device;
(ii) a second device, and
(iii) an interface connector,
and wherein a first terminal of said first device is connected to a first terminal of said interface connector, a second terminal of said first device is connected to a second terminal of said interface connector, a first terminal of said second device is connected to a third terminal of said interface connector, and a second terminal of said second device is connected to a fourth terminal of said interface connector, said interface connector operative to mate with a said submodule connector such that respective terminals of said interface connector are connected to corresponding terminals of said submodule connector.

7. The system of claim 1, wherein said interface includes:
(i) a module carrier board;
(ii) a backplane, and
(iii) a processor,
said module carrier board operative to accept at least one said submodule, said module carrier board having at least one field connector operative to connect a field terminal of said submodule to an external device, said module carrier board also having a control connector operative to connect said module carrier board to said backplane, said backplane operative to connect said module carrier board to said processor.

8. The system of claim 7, wherein said module carrier board is operative to supply a signal proportional to a power supply voltage of said module carrier board, and wherein said backplane is operative to disable an output of said backplane until said signal has been at a value at least equal to a predetermined threshold value for at least a predetermined time interval.

9. The system of claim 8, wherein said disabling includes setting said output to a high-impedance state.

10. An automatic addressing system comprising a plurality of units, each said unit including:
(a) a first connector having address-assignment terminals having number no less than said units, less one;
(b) a second connector having address-assignment terminals like in number to said address-assignment terminals of said first connector, each said address-assignment terminal of said second connector being in a position corresponding to an address-assignment terminal of said first connector, and
(c) address-assignment lines one less in number than said address-assignment terminals of said first connector, each said address-assignment line operative to electrically connect an address-assignment terminal of said first connector to a non-corresponding address-assignment terminal of said second connector;
(d) a mechanism operative to impress a low logic level upon a said address-assignment terminal of said second connector of said unit that is unconnected to any said address-assignment line of said unit, if all said address-assignment terminals of said first connector of said unit are at a high logic level;
(e) decoded address lines one greater in number than said address-assignment terminals, one respective said decoded address line corresponding to said address assignment terminal of said second connector of said unit that is unconnected to any said address-assignment line of said unit, and all respective other said decoded address lines each corresponding to a respective address-assignment terminal of said first connector of said unit, and
(f) a mechanism operative to activate a unit-addressed signal if a condition selected from the group consisting of the condition of said address-assignment terminal of said second connector of said unit that is unconnected to any said address-assignment line of said unit being at a low logic level and said corresponding decoded address line being active, and the condition of a said address-assignment terminal of said first connector of said unit being at a low logic level and a corresponding said decoded address line being active, exists, and wherein said first connector of each said unit is operative to be connected to said second connector of another said unit, except that said first connector of a first said unit is not connected to any other said unit, and said second connector of a last said unit is not connected to any other said unit.

11. The system of claim 10, further comprising:
(g) a mechanism operative to disable an output of a portion of said unit if any said address-assignment terminal of said first connector of said unit is at a low logic level.

12. The system of claim 11, wherein said disabling includes setting said output to a high-impedance state.

13. A method for automatically addressing a plurality of units, the method comprising the steps of:
(a) providing for each said unit:
(i) a first connector having address-assignment terminals having number no less than said units, less one;
(ii) a second connector having address-assignment terminals like in number to said address-assignment terminals of said first connector, each said address-assignment terminal of said second connector being in a position corresponding to an address-assignment terminal of said first connector, and
(iii) address-assignment lines one less in number than said address-assignment terminals of said first connector, each said address-assignment line operative to electrically connect an address-assignment terminal of said first connector to a non-corresponding address-assignment terminal of said second connector;
(iv) a mechanism operative to impress a low logic level upon a said address-assignment terminal of said second connector of said unit that is unconnected to any said address-assignment line of said unit, if all said address-assignment terminals of said first connector of said unit are at a high logic level;
(v) decoded address lines one greater in number than said address-assignment terminals, one respective said decoded address line corresponding to said address-assignment terminal of said second connector of said unit that is unconnected to any said address-assignment line of said unit, and all respective other said decoded address lines each corresponding to a respective address-assignment terminal of said first connector of said unit, and (vi) a mechanism operative to activate a unit-addressed signal if a condition selected from the group consisting of the condition of said address-assignment terminal of said second connector of said unit that is unconnected to any said address-assignment line of said unit being at a low logic level and said corresponding coded address line being active, and the condition of a said address-assignment terminal of said first connector of said unit being at a low logic level and a corresponding said decoded address line being active, exists, and (b) connecting said first connector of each said unit to a said second connector of another said unit, except that said first connector of a first said unit is not connected to any other said unit, and said second connector of a last said unit is not connected to any other said unit.

\* \* \* \* \*